(12) United States Patent
Huang et al.

(10) Patent No.: US 11,956,336 B2
(45) Date of Patent: Apr. 9, 2024

(54) SERVICE INDICATION METHOD AND APPARATUS

(71) Applicant: HUAWEI TECHNOLOGIES CO., LTD., Shenzhen (CN)

(72) Inventors: Guogang Huang, Shenzhen (CN); Zhaoxia Liu, Shenzhen (CN); Yuchen Guo, Shenzhen (CN); Yunbo Li, Shenzhen (CN); Ming Gan, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/357,292

(22) Filed: Jul. 24, 2023

(65) Prior Publication Data

US 2023/0370533 A1 Nov. 16, 2023

Related U.S. Application Data

(63) Continuation of application No. PCT/CN2022/073566, filed on Jan. 24, 2022.

(30) Foreign Application Priority Data

| Feb. 4, 2021 | (CN) | 202110155010.2 |
| Mar. 17, 2021 | (CN) | 202110287709.4 |
| May 18, 2021 | (CN) | 202110542644.3 |

(51) Int. Cl.
*H04L 69/14* (2022.01)
*H04L 43/062* (2022.01)
*H04W 84/12* (2009.01)

(52) U.S. Cl.
CPC ............ *H04L 69/14* (2013.01); *H04L 43/062* (2013.01); *H04W 84/12* (2013.01)

(58) Field of Classification Search
None
See application file for complete search history.

(56) References Cited

U.S. PATENT DOCUMENTS

| 2006/0218271 A1 | 9/2006 | Kasslin et al. |
| 2015/0180770 A1* | 6/2015 | Wang ................ H04L 45/66 370/392 |

(Continued)

FOREIGN PATENT DOCUMENTS

| CN | 1905748 A | 1/2007 |
| CN | 104796235 A | 7/2015 |

(Continued)

OTHER PUBLICATIONS

Chinese Office Action issued in corresponding Chinese Application No. 202310613627.3, dated Nov. 13, 2023, pp. 1-6.

(Continued)

*Primary Examiner* — Xavier S Wong
(74) *Attorney, Agent, or Firm* — HAUPTMAN HAM, LLP

(57) ABSTRACT

A method includes generating quality of service requirement information which includes packet loss rate indication information. The packet loss rate indication information includes an acceptable maximum packet loss rate and a reference number of service data packets. The reference number of service data packets indicates a reference measurement number for counting the packet loss rate. The method also includes sending the quality of service requirement information.

20 Claims, 19 Drawing Sheets

(56) References Cited

U.S. PATENT DOCUMENTS

2019/0261191 A1* 8/2019 Nakano ............... H04L 41/0806
2019/0319868 A1  10/2019 Svennebring et al.
2021/0014776 A1   1/2021 Patil et al.
2021/0204172 A1*  7/2021 Rost ................... H04W 28/0268
2022/0191733 A1*  6/2022 Ali .......................... H04W 4/40

FOREIGN PATENT DOCUMENTS

| CN | 105577546 A | 5/2016 |
| CN | 110120878 A | 8/2019 |
| EP | 2530876 A1  | 12/2012 |

OTHER PUBLICATIONS

R2-154371, Samsung, QoS handling of offloaded bearer in LWA, 3GPP TSG-RAN2 Meeting #91bis, Malmo, Sweden, Oct. 5-9, 2015, 3 pages.

IEEE 802.11-19/1266r1, Norman Finn, Wireless + TSN = Part of the Picture, Jul. 2019, 12 pages.

802.11-2020—IEEE Standard for Information Technology—Telecommunications and Information Exchange between Systems—Local and Metropolitan Area Networks—Specific Requirements—Part 11: Wireless LAN Medium Access Control (MAC) and Physical Layer (PHY) Specifications, 7524 pages.

International Search Report issued in corresponding International Application No. PCT/CN2022/073566, dated Apr. 19, 2022, pp. 1-9.

Taiwan Office Action issued in corresponding Taiwan Application No. 111103829, dated Feb. 22, 2023, pp. 1-10.

\* cited by examiner

| Element ID | Length | Traffic identifier bitmap | Transmission direction | Minimum service interval | Maximum service interval | Inactivity interval | Suspension interval | Service start time | Minimum data rate |
|---|---|---|---|---|---|---|---|---|---|
| 1 | 1 | 1 | 1 | 4 | 4 | 4 | 4 | 4 | 4 |

| Mean data rate | Burst size | Delay bound | Discard age | Acceptable maximum number of lost packets | Reference number of service data packets | Indication information indicating whether to enable triggering, based on an average packet loss rate, sending quality of service requirement information | Threshold of the average packet loss rate |
|---|---|---|---|---|---|---|---|
| 4 | 4 | 4 | 2 | 4 | 4 | 1 | 1 |

FIG.5

| Element ID | Length | Traffic identifier bitmap | Transmission direction | Minimum service interval | Maximum service interval | Inactivity interval | Suspension interval | Service start time | Minimum data rate |
|---|---|---|---|---|---|---|---|---|---|
| 1 | 1 | 1 | 1 | 4 | 4 | 4 | 4 | 4 | 4 |

| Mean data rate | Burst size | Delay bound | Discard age | Acceptable maximum packet loss rate | Reference number of service data packets | Indication information indicating whether to enable triggering, based on an average packet loss rate, sending quality of service requirement information | Threshold of the average packet loss rate |
|---|---|---|---|---|---|---|---|
| 4 | 4 | 4 | 2 | 4 | 4 | 1 | 1 |

FIG.6

| Element ID | Length | Traffic identifier bitmap | Number of a plurality of links carrying services | Actual measurement start time of a quality of service measurement report | Total number of MSDUs successfully sent on the plurality of links carrying services | Total number of MSDUs discarded on the plurality of links carrying services | Total number of MSDUs unsuccessfully sent on the plurality of links carrying services |
|---|---|---|---|---|---|---|---|

| Total number of MSDUs retransmitted for a plurality of times on the plurality of links carrying services | Average transmit delay of the plurality of links carrying services | Basic delay range | Bin 0 | Bin 1 | Bin 2 | Bin 3 | Bin 4 | Bin 5 | Link identifier of each of the plurality of links carrying services | Number of MSDUs lost on each of the plurality of links carrying services |
|---|---|---|---|---|---|---|---|---|---|---|

Repeat N times

FIG.8

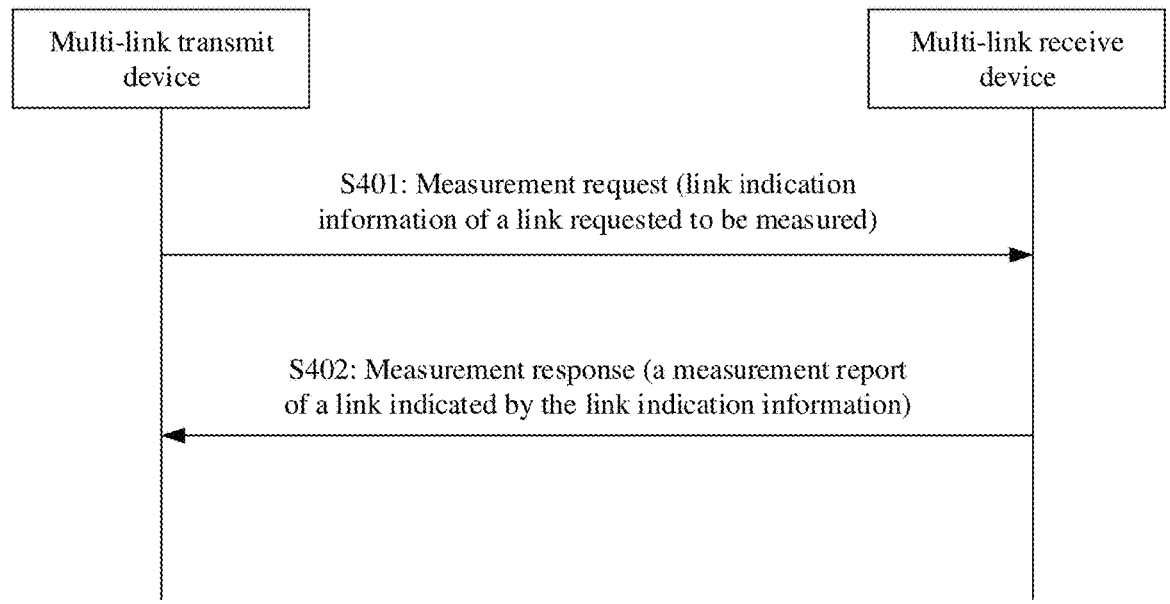
FIG. 11
| Element ID | Element length | Measurement request information | Subelement ID | Subelement length | Link indication information of a link requested to be measured |
FIG. 12
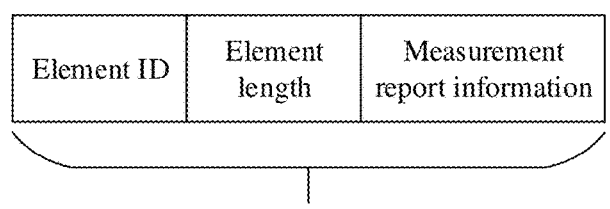
Repeat N times
FIG. 13

| Category | Spectrum management action | Dialog token | Measurement request element |
|---|---|---|---|

Byte: 1 1 1 Variable

FIG. 14

| Element ID | Length | Measurement token | Measurement request mode | Measurement type | Measurement request |
|---|---|---|---|---|---|

Byte: 1 1 1 1 1 Variable

FIG. 15

| Randomization interval | Measurement duration | Peer station address | Traffic identifier | Bin 0 range | Optional subelement |
|---|---|---|---|---|---|
| 2 | 2 | 6 | 1 | 1 | Variable |

| 0 | Reserved | TID |
|---|---|---|

| 1 SCSID (B0) | SCSID (B1 to B7) |
|---|---|

FIG. 17

| Category | Spectrum management action | Dialog token | Measurement report element |
|---|---|---|---|

Byte: 1     1     1     Variable

FIG. 18

| Delay | Incapable | Refused | Reserved |
|---|---|---|---|

Bit: 1     1     1     5

| Element ID | Length | Measurement token | Measurement report mode | Measurement type | Measurement report |
|---|---|---|---|---|---|

Byte: 1     1     1     1     1     Variable

FIG. 19

| Actual measurement start time | Measurement duration | Peer station address | Traffic identifier | Reporting reason | Transmitted MSDU count | MSDU discarded count | MSDU failed count |
|---|---|---|---|---|---|---|---|

| MSDU multiple retry count | QoS CF-Polls lost count or MSDU delivery count | Average transmit delay | Bin 0 range | Bin 0 | Bin 1 | Bin 2 | Bin 3 | Bin 4 | Bin 5 | Optional subelement |
|---|---|---|---|---|---|---|---|---|---|---|

FIG. 20

| Subelement ID | Length | Link bitmap | Transmitted MSDU/MPDU count list | MSDU/MPDU lost count list |
|---|---|---|---|---|
FIG. 23
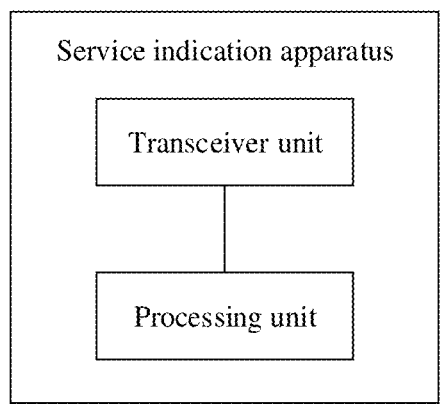
FIG. 24
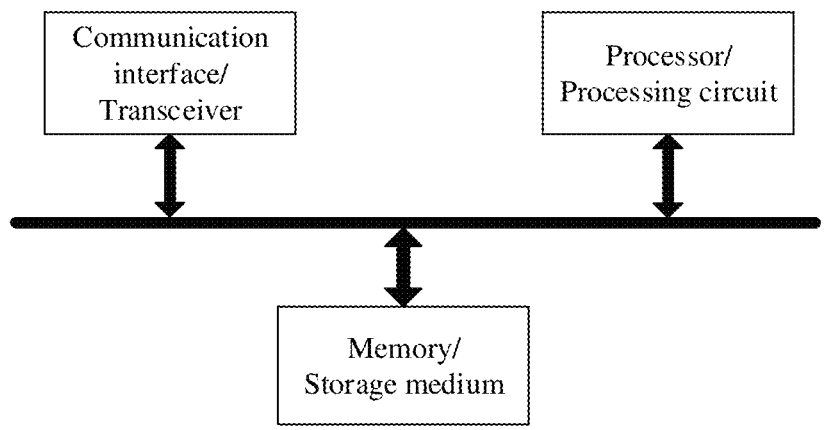
FIG. 25
| Category | Robust action | Dialog token | Stream classification service descriptor list |
|---|---|---|---|
FIG. 26

SERVICE INDICATION METHOD AND APPARATUS

CROSS-REFERENCE TO RELATED APPLICATION

This application is a continuation of International Application No. PCT/CN2022/073566, filed on Jan. 24, 2022, which claims priority to Chinese Patent Application No. 202110542644.3, filed on May 18, 2021, which claims priority to Chinese Patent Application No. 202110287709.4, filed on Mar. 17, 2021, which claims priority to Chinese Patent Application No. 202110155010.2, filed on Feb. 4, 2021. All of the aforementioned patent applications are hereby incorporated by reference in their entireties.

TECHNICAL FIELD

This application relates to the field of communication technologies, and in particular, to a service indication method and apparatus.

BACKGROUND

A low delay is an important feature of the 802.11be. Performing multi-link (multi-link) transmission between a transmit device and a receive device can greatly reduce a delay of a data packet. However, currently, there is no solution for indicating quality of service (QoS) of a plurality of links in a multi-link scenario, and the receive device cannot determine which link causes poor QoS of a low-delay service.

SUMMARY

This application provides a service indication method and apparatus, to accurately determine quality of service of each of a plurality of links.

According to a first aspect, a service indication method is provided. The method includes: generating a quality of service measurement report, where the quality of service measurement report includes link indication information and quality of service information of a link, the link indication information indicates a plurality of links carrying services, and the quality of service information of a link includes a number of media access control service data units lost on each of the plurality of links carrying services; and sending the quality of service measurement report. In this aspect, a multi-link transmit device includes quality of service information of a link and link indication information in the quality of service measurement report. The link indication information indicates the plurality of links carrying services. The quality of service information of a link includes the number of media access control service data units lost on each of the plurality of links carrying services. Therefore, a peer end may accurately determine quality of service of each of the plurality of links based on the quality of service measurement report. This improves reliability of service transmission.

According to a second aspect, a service indication method is provided. The method includes: receiving a quality of service measurement report, where the quality of service measurement report includes link indication information and quality of service information of a link, the link indication information indicates a plurality of links carrying services, and the quality of service information of a link includes a number of media access control service data units lost on each of the plurality of links carrying services; and determining, based on the quality of service measurement report, quality of service of each of the plurality of links carrying services. In this aspect, a multi-link receive device receives the quality of service measurement report sent by a multi-link transmit device. The quality of service measurement report includes the link indication information and the quality of service information of a link. The link indication information indicates the plurality of links carrying services. The quality of service information of a link includes the number of media access control service data units lost on each of the plurality of links carrying services. Therefore, quality of service of each of the plurality of links may be accurately determined based on the quality of service measurement report. This improves reliability of service transmission.

After the multi-link receive device determines the quality of service of each of the plurality of links carrying services, a corresponding operation may be performed on a link whose quality of service is lower than a quality of service requirement of a low-delay service, to further improve quality of service of the low-delay service carried on the link. In one manner, APs may choose to negotiate a correspondence (TID-to-link) between a traffic identifier and a link, so that a plurality of links correspond to one TID, to reduce a delay of the service. In another manner, a corresponding restricted service period is established for the link whose quality of service is lower than the quality of service requirement of the low-delay service, so that only the low-delay service can be transmitted in the restricted service period, to avoid interference caused by another service to the low-delay service, or the like.

With reference to the first aspect or the second aspect, in a possible implementation, the link indication information includes a number of the plurality of links carrying services and a link identifier of each of the plurality of links carrying services.

With reference to the first aspect or the second aspect, in another possible implementation, the link indication information is implemented by using a bitmap. A first value of the bitmap indicates the plurality of links carrying services.

With reference to the first aspect or the second aspect, in still another possible implementation, the quality of service measurement report further includes at least one piece of the following information: a traffic classification service identifier, actual measurement start time of the quality of service measurement report, a total number of media access control service data units successfully sent on the plurality of links carrying services, a total number of media access control service data units discarded on the plurality of links carrying services, a total number of media access control service data units unsuccessfully sent on the plurality of links carrying services, a total number of media access control service data units retransmitted for a plurality of times on the plurality of links carrying services, an average transmit delay of the plurality of links carrying services, a number of times of receiving no acknowledgement on each of the plurality of links carrying services, a number of times of receiving an overlapping basic service set on each of the plurality of links carrying services, a channel load of each of the plurality of links carrying services, a basic delay range, and a total number of media access control service data units on the plurality of links carrying services within at least one delay range. The at least one delay range is obtained based on the basic delay range. In this implementation, all the foregoing parameters in the quality of service measurement report may represent quality of service of a plurality of links that carry the low-delay service. The quality of service measurement report may include the foregoing parameters, or may include some of the plurality of parameters.

According to a third aspect, a service indication method is provided. The method includes: generating quality of service requirement information, where the quality of service requirement information includes packet loss rate indication information; and sending the quality of service requirement information. In this aspect, a transmit device generates the quality of service requirement information. The quality of service requirement information includes the packet loss rate indication information. The transmit device sends the quality of service requirement information to a receive device. Therefore, the receive device may determine, based on the quality of service requirement information, whether to agree on establishment of a low-delay service. If establishment of the low-delay service is agreed, a packet loss rate needs to be minimized while meeting a delay requirement. In this aspect, the transmit device generates the quality of service requirement information. The quality of service requirement information includes the packet loss rate indication information. The transmit device sends the quality of service requirement information to the receive device. Therefore, the receive device may determine, based on the quality of service requirement information, whether to agree on establishment of the low-delay service. If establishment of the low-delay service is agreed, the packet loss rate needs to be minimized while meeting the delay requirement.

According to a fourth aspect, a service indication method is provided. The method includes: receiving quality of service requirement information, where the quality of service requirement information includes packet loss rate indication information; and determining a quality of service requirement based on the quality of service requirement information. In this aspect, a receive device receives the quality of service requirement information sent by a transmit device. The quality of service requirement information includes the packet loss rate indication information. The receive device may determine, based on the quality of service requirement information, whether to agree on establishment of a low-delay service. If establishment of the low-delay service is agreed, a packet loss rate needs to be minimized while meeting a delay requirement.

With reference to the third aspect or the fourth aspect, in a possible implementation, the packet loss rate indication information includes an acceptable maximum number of lost packets and a reference number of service data packets.

With reference to the third aspect or the fourth aspect, in another possible implementation, the packet loss rate indication information includes an acceptable maximum packet loss rate and a reference number of service data packets.

With reference to the third aspect or the fourth aspect, in still another possible implementation, the quality of service requirement information further includes: indication information indicating whether to enable triggering, based on an average packet loss rate, sending the quality of service requirement information, and a threshold of the average packet loss rate.

With reference to the third aspect or the fourth aspect, in yet another possible implementation, the quality of service requirement information further includes at least one piece of the following information: indication information indicating whether a service is a high-reliability service, maximum delay jitter of a service, indication information indicating whether to use a backup transmission mode, indication information indicating an expected channel access manner, and indication information indicating whether a restricted service period is to be established.

According to a fifth aspect, a service indication apparatus is provided, configured to perform the method according to any one of the first aspect or the possible implementations of the first aspect. The service indication apparatus may be the terminal according to any one of the first aspect or the possible implementations of the first aspect, or a module used in the terminal, for example, a chip or a chip system. The service indication apparatus includes a corresponding module, unit, or means for implementing the foregoing methods. The module, unit, or means may be implemented by hardware, software, or hardware executing corresponding software. The hardware or the software includes one or more modules or units corresponding to the foregoing functions.

With reference to the fifth aspect, in a possible implementation, the service indication apparatus includes a transceiver unit and a processing unit. The processing unit is configured to generate a quality of service measurement report. The quality of service measurement report includes link indication information and quality of service information of a link. The link indication information indicates a plurality of links carrying services. The quality of service information of a link includes a number of media access control service data units lost on each of the plurality of links carrying services. The transceiver unit is configured to send the quality of service measurement report.

With reference to the fifth aspect, in another possible implementation, the service indication apparatus includes an input interface, an output interface, and a processing circuit. The processing circuit is configured to generate a quality of service measurement report. The quality of service measurement report includes link indication information and quality of service information of a link. The link indication information indicates a plurality of links carrying services. The quality of service information of a link includes a number of media access control service data units lost on each of the plurality of links carrying services. The output interface is configured to send the quality of service measurement report.

For example, the service indication apparatus further includes a memory. The memory is coupled to at least one processor. The at least one processor is configured to run program instructions stored in the memory, so that the service indication apparatus performs the method according to any one of the first aspect or the possible implementations of the first aspect.

In a possible implementation, the memory is configured to store program instructions and data. The memory is coupled to the at least one processor. The at least one processor may invoke and execute the program instructions stored in the memory, so that the service indication apparatus performs the method according to any one of the first aspect or the possible implementations of the first aspect.

For example, the service indication apparatus further includes a communication interface. The communication interface is used by the service indication apparatus to communicate with another device. When the service indication apparatus is the terminal, the communication interface is a transceiver, an input/output interface, a circuit, or the like.

In a possible design, the service indication apparatus includes at least one processor and a communication interface, configured to perform the method according to any one of the first aspect or the possible implementations of the first aspect. The at least one processor communicates with an external device through the communication interface. The at least one processor is configured to run a computer program, so that the service indication apparatus performs the method according to any one of the first aspect or the possible implementations of the first aspect. It may be understood that the external device may be an object other than the processor or an object other than the service indication apparatus.

In another possible design, the service indication apparatus is a chip or a chip system. The communication interface may be an input/output interface, an interface circuit, an output circuit, an input circuit, a pin, a related circuit, or the like in the chip or chip system. The processor may alternatively be embodied as a processing circuit or a logic circuit.

For technical effects achieved in any design of the fifth aspect, refer to technical effects achieved in different designs of the first aspect. Details are not described herein again.

According to a sixth aspect, a service indication apparatus is provided, configured to perform the method according to any one of the second aspect or the possible implementations of the second aspect. The service indication apparatus may be the access network device according to any one of the second aspect or the possible implementations of the second aspect, or a module used in the access network device, for example, a chip or a chip system. The service indication apparatus includes a corresponding module, unit, or means for implementing the foregoing methods. The module, unit, or means may be implemented by hardware, software, or hardware executing corresponding software. The hardware or the software includes one or more modules or units corresponding to the foregoing functions.

With reference to the sixth aspect, in a possible implementation, the service indication apparatus includes a transceiver unit and a processing unit. The transceiver unit is configured to receive a quality of service measurement report. The quality of service measurement report includes link indication information and quality of service information of a link. The link indication information indicates a plurality of links carrying services. The quality of service information of a link includes a number of media access control service data units lost on each of the plurality of links carrying services. The processing unit is configured to determine, based on the quality of service measurement report, quality of service of each of the plurality of links carrying services.

With reference to the sixth aspect, in another possible implementation, the service indication apparatus includes an input interface, an output interface, and a processing circuit. The input interface is configured to receive a quality of service measurement report. The quality of service measurement report includes link indication information and quality of service information of a link. The link indication information indicates a plurality of links carrying services. The quality of service information of a link includes a number of media access control service data units lost on each of the plurality of links carrying services. The processing circuit is configured to determine, based on the quality of service measurement report, quality of service of each of the plurality of links carrying services.

In a possible implementation, the memory is configured to store program instructions and data. The memory is coupled to the at least one processor. The at least one processor may invoke and execute the program instructions stored in the memory, so that the service indication apparatus performs the method according to any one of the second aspect or the possible implementations of the second aspect.

For example, the service indication apparatus further includes a communication interface. The communication interface is used by the service indication apparatus to communicate with another device. When the service indication apparatus is the access network device, the communication interface is a transceiver, an input/output interface, a circuit, or the like.

In a possible design, the service indication apparatus includes at least one processor and a communication interface, configured to perform the method according to any one of the second aspect or the possible implementations of the second aspect. The at least one processor communicates with an external device through the communication interface. The at least one processor is configured to run a computer program, so that the service indication apparatus performs the method according to any one of the second aspect or the possible implementations of the second aspect. It may be understood that the external device may be an object other than the processor or an object other than the service indication apparatus.

In another possible design, the service indication apparatus is a chip or a chip system. The communication interface may be an input/output interface, an interface circuit, an output circuit, an input circuit, a pin, a related circuit, or the like in the chip or chip system. The processor may alternatively be embodied as a processing circuit or a logic circuit.

For technical effects achieved in any design of the sixth aspect, refer to technical effects achieved in different designs of the second aspect. Details are not described herein again.

According to a seventh aspect, a service indication apparatus is provided, configured to perform the method according to any one of the third aspect or the possible implementations of the third aspect. The service indication apparatus may be the terminal according to any one of the third aspect or the possible implementations of the third aspect, or a module used in the terminal, for example, a chip or a chip system. The service indication apparatus includes a corresponding module, unit, or means for implementing the foregoing methods. The module, unit, or means may be implemented by hardware, software, or hardware executing corresponding software. The hardware or the software includes one or more modules or units corresponding to the foregoing functions.

With reference to the seventh aspect, in a possible implementation, the service indication apparatus includes a transceiver unit and a processing unit. The processing unit is configured to generate quality of service requirement information. The quality of service requirement information includes packet loss rate indication information. The transceiver unit is configured to send the quality of service requirement information.

With reference to the seventh aspect, in another possible implementation, the service indication apparatus includes an input interface, an output interface, and a processing circuit. The processing circuit is configured to generate quality of service requirement information. The quality of service requirement information includes packet loss rate indication information. The output interface is configured to send the quality of service requirement information.

For example, the service indication apparatus further includes a memory. The memory is coupled to at least one processor. The at least one processor is configured to run program instructions stored in the memory, so that the service indication apparatus performs the method according to any one of the third aspect or the possible implementations of the third aspect.

In a possible implementation, the memory is configured to store program instructions and data. The memory is coupled to the at least one processor. The at least one processor may invoke and execute the program instructions stored in the memory, so that the service indication apparatus performs the method according to any one of the third aspect or the possible implementations of the third aspect.

For example, the service indication apparatus further includes a communication interface. The communication interface is used by the service indication apparatus to communicate with another device. When the service indication apparatus is the terminal, the communication interface is a transceiver, an input/output interface, a circuit, or the like.

In a possible design, the service indication apparatus includes at least one processor and a communication interface, configured to perform the method according to any one of the third aspect or the possible implementations of the third aspect. The at least one processor communicates with an external device through the communication interface. The at least one processor is configured to run a computer program, so that the service indication apparatus performs the method according to any one of the third aspect or the possible implementations of the third aspect. It may be understood that the external device may be an object other than the processor or an object other than the service indication apparatus.

In another possible design, the service indication apparatus is a chip or a chip system. The communication interface may be an input/output interface, an interface circuit, an output circuit, an input circuit, a pin, a related circuit, or the like in the chip or chip system. The processor may alternatively be embodied as a processing circuit or a logic circuit.

For technical effects achieved in any design of the seventh aspect, refer to technical effects achieved in different designs of the third aspect. Details are not described herein again.

According to an eighth aspect, a service indication apparatus is provided, configured to perform the method according to any one of the fourth aspect or the possible implementations of the fourth aspect. The service indication apparatus may be the access network device according to any one of the fourth aspect or the possible implementations of the fourth aspect, or a module used in the access network device, for example, a chip or a chip system. The service indication apparatus includes a corresponding module, unit, or means for implementing the foregoing methods. The module, unit, or means may be implemented by hardware, software, or hardware executing corresponding software. The hardware or the software includes one or more modules or units corresponding to the foregoing functions.

With reference to the eighth aspect, in a possible implementation, the service indication apparatus includes a transceiver unit and a processing unit. The transceiver unit is configured to receive quality of service requirement information. The quality of service requirement information includes packet loss rate indication information. The processing unit is configured to determine a quality of service requirement based on the quality of service requirement information.

With reference to the eighth aspect, in another possible implementation, the service indication apparatus includes an input interface, an output interface, and a processing circuit. The input interface is configured to receive quality of service requirement information. The quality of service requirement information includes packet loss rate indication information. The processing circuit is configured to determine a quality of service requirement based on the quality of service requirement information.

In a possible implementation, the memory is configured to store program instructions and data. The memory is coupled to the at least one processor. The at least one processor may invoke and execute the program instructions stored in the memory, so that the service indication apparatus performs the method according to any one of the fourth aspect or the possible implementations of the fourth aspect.

For example, the service indication apparatus further includes a communication interface. The communication interface is used by the service indication apparatus to communicate with another device. When the service indication apparatus is the access network device, the communication interface is a transceiver, an input/output interface, a circuit, or the like.

In a possible design, the service indication apparatus includes at least one processor and a communication interface, configured to perform the method according to any one of the fourth aspect or the possible implementations of the fourth aspect. The at least one processor communicates with an external device through the communication interface. The at least one processor is configured to run a computer program, so that the service indication apparatus performs the method according to any one of the fourth aspect or the possible implementations of the fourth aspect. It may be understood that the external device may be an object other than the processor or an object other than the service indication apparatus.

In another possible design, the service indication apparatus is a chip or a chip system. The communication interface may be an input/output interface, an interface circuit, an output circuit, an input circuit, a pin, a related circuit, or the like in the chip or chip system. The processor may alternatively be embodied as a processing circuit or a logic circuit.

For technical effects achieved in any design of the eighth aspect, refer to technical effects achieved in different designs of the fourth aspect. Details are not described herein again.

According to a ninth aspect, a communication system is provided, including the service indication apparatus according to any one of the fifth aspect or the implementations of the fifth aspect and the service indication apparatus according to any one of the sixth aspect or the implementations of the sixth aspect.

According to a tenth aspect, a communication system is provided, including the service indication apparatus according to any one of the seventh aspect or the implementations of the seventh aspect and the service indication apparatus according to any one of the eighth aspect or the implementations of the eighth aspect.

According to an eleventh aspect, a computer-readable storage medium is provided. The computer-readable storage medium stores a computer program. When the computer program runs on a computer, the method according to any one of the foregoing aspects or the implementations of the aspects is performed.

According to a twelfth aspect, a computer program product is provided. When the computer program product runs on a computer, the method according to any one of the foregoing aspects or the implementations of the aspects is performed.

According to a thirteenth aspect, a computer program is provided. When the computer program runs on a computer, the method according to any one of the foregoing aspects or the implementations of the aspects is performed.

BRIEF DESCRIPTION OF DRAWINGS

FIG. 5 is a schematic diagram of a format of a traffic specification element in accordance with one or more embodiments;

FIG. 6 is a schematic diagram of a format of another traffic specification element in accordance with one or more embodiments;

FIG. 8 is a schematic diagram of a format of still another traffic specification element in accordance with one or more embodiments;

FIG. 11 is a schematic flowchart of yet another service indication method in accordance with one or more embodiments;

FIG. 12 is a schematic diagram of a format of still yet another traffic specification element in accordance with one or more embodiments;

FIG. 13 is a schematic diagram of a format of still yet another traffic specification element in accordance with one or more embodiments;

FIG. 14 is a schematic diagram of a frame format of a spectrum measurement request frame in accordance with one or more embodiments;

FIG. 15 is a schematic diagram of a format of a measurement request element in accordance with one or more embodiments;

FIG. 16 is a schematic diagram of a format of a measurement request in accordance with one or more embodiments;

FIG. 17 is a schematic diagram of a format of a traffic identifier field in accordance with one or more embodiments;

FIG. 18 is a schematic diagram of a format of a spectrum measurement response frame in accordance with one or more embodiments;

FIG. 19 is a schematic diagram of a format of a measurement report element in accordance with one or more embodiments;

FIG. 20 is a schematic diagram of a format of a measurement report in accordance with one or more embodiments;

FIG. 23 is a schematic diagram of a format of a multi-link measurement report subelement in accordance with one or more embodiments;

FIG. 24 is a schematic diagram of a structure of a service indication apparatus in accordance with one or more embodiments;

FIG. 25 is a schematic diagram of a structure of another service indication apparatus in accordance with one or more embodiments;

FIG. 26 is a schematic diagram of a format of an SCS request frame in accordance with one or more embodiments;

DESCRIPTION OF EMBODIMENTS

The following describes embodiments of this application with reference to the accompanying drawings in embodiments of this application.

Figure 1:
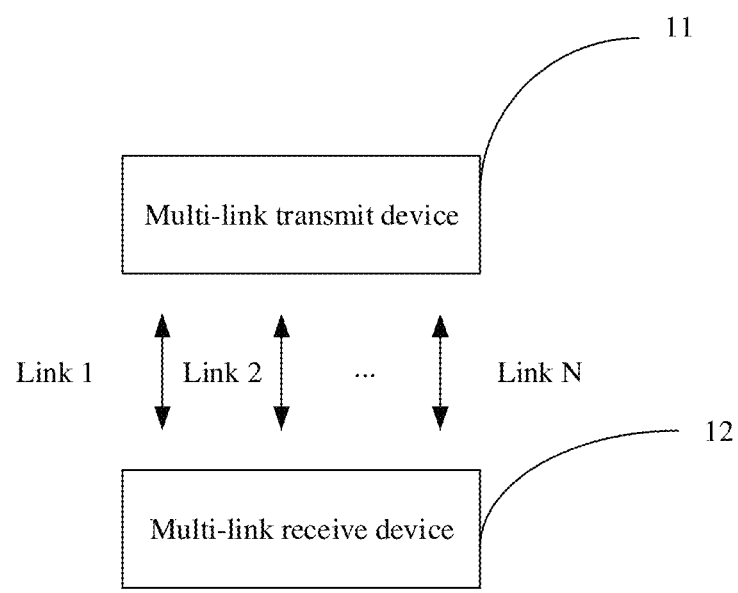
FIG. 1 is a schematic diagram of a structure of a communication system in accordance with one or more embodiments.
Figure 2:
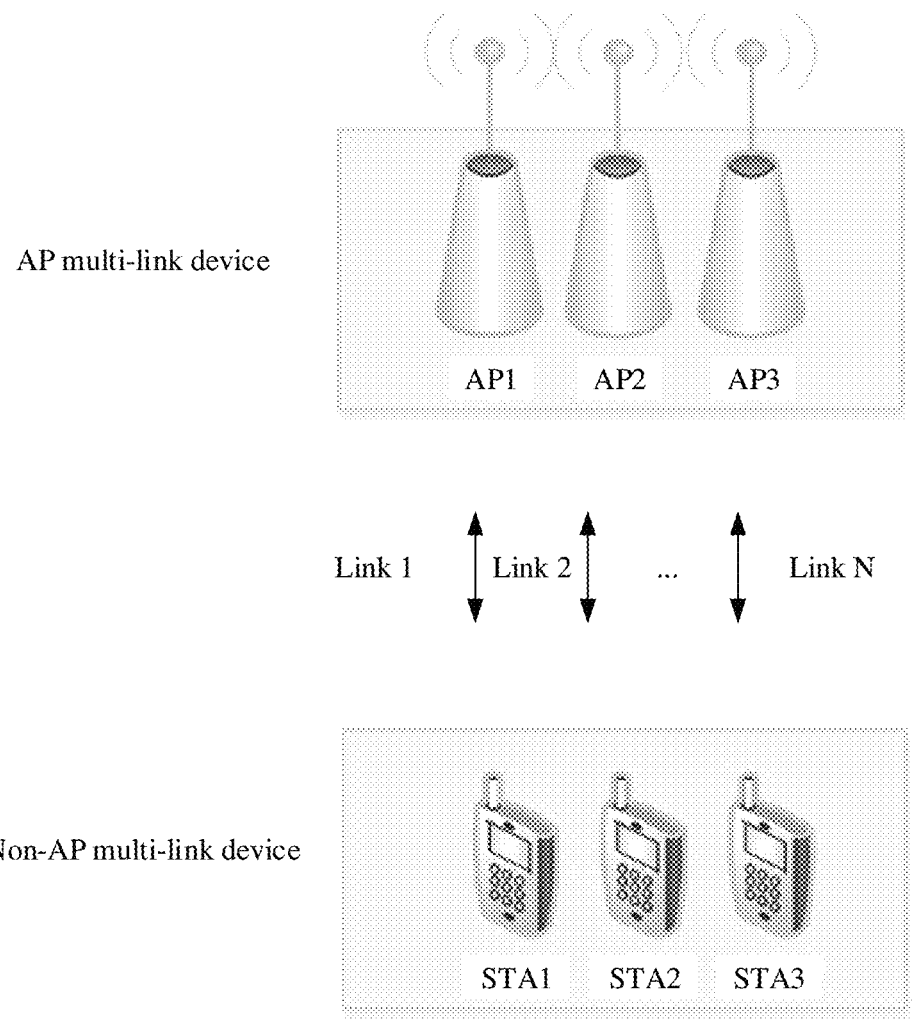
FIG. 2 is a schematic diagram of an example multi-link transmission scenario in accordance with one or more embodiments.

The solutions of this application are mainly applied to a wireless local area network, and in particular to a multi-link transmission scenario. FIG. 1 is a schematic diagram of a structure of a communication system in accordance with one or more embodiments. The communication system 100 includes a multi-link transmit device 11 and a multi-link receive device 12. The multi-link transmit device 11 and the multi-link receive device 12 (collectively referred to as "multi-link devices") communicate with each other through N links. N is a positive integer. A frequency band on which the multi-link device operates may be any one of the following frequency bands: 1 GHz, 2.4 GHz, 5 GHz, 6 GHz, all or a part of a high frequency 60 GHz, and the like. FIG. 2 is a schematic diagram of a multi-link transmission scenario in accordance with one or more embodiments. The multi-link transmit device may include one or more access points (APs) (which may also be referred to as an access point multi-link device (AP MLD)), and the multi-link receive device may include one or more stations (STAs) (which may also be referred to as a non-access point multi-link device (NON-AP MLD)). Alternatively, the multi-link transmit device may include one or more STAs, and the multi-link receive device may include one or more APs.

Figure 3:
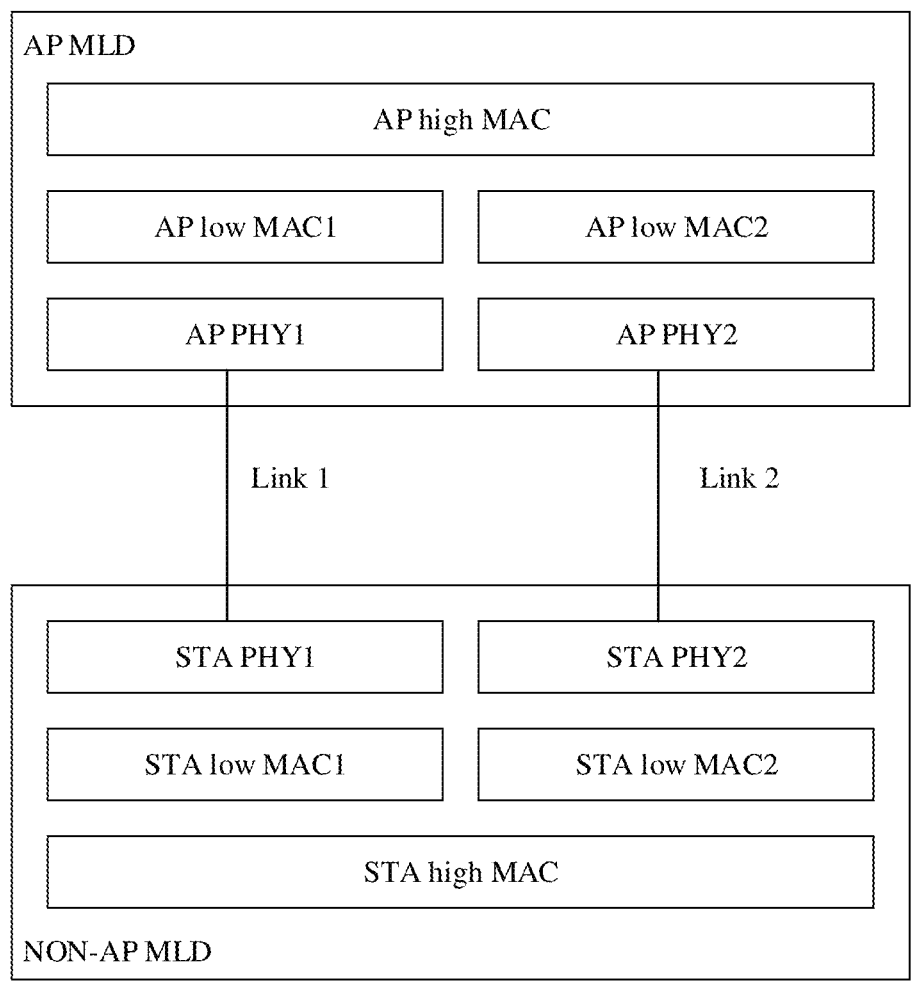
FIG. 3 is a schematic diagram of a structure of a multi-link in accordance with one or more embodiments.

FIG. 3 is a schematic diagram of a structure of a multi-link device. Structures of the AP MLD and the non-AP MLD may include a media access control (MAC) layer and a physical layer (PHY). The MAC layer is further divided into a high MAC layer and a low MAC layer. A plurality of APs in the AP MLD share one AP high MAC, and each AP corresponds to one AP low MAC. A plurality of STAs in the non-AP MLD share one STA high MAC, and each AP corresponds to one STA low MAC. An AP PHY of each AP in the AP MLD communicates with a STA PHY of one STA in a corresponding non-AP MLD through a link.

When a transmit device needs to establish a low-delay service, the transmit device may notify a receive device of a specific QoS requirement of the low-delay service by using a traffic specification element (TSPEC element). However, the traffic specification does not include an indication of a packet loss rate that needs to be met. In addition, for a wireless system, it is difficult to ensure a zero packet loss rate when a delay requirement is met.

In view of this, this application provides a service indication solution. A transmit device generates quality of service requirement information. The quality of service requirement information includes packet loss rate indication information. The transmit device sends the quality of service requirement information to a receive device. Therefore, the receive device may determine, based on the quality of service requirement information, whether to agree on establishment of a low-delay service. If establishment of the low-delay service is agreed, a packet loss rate needs to be minimized while meeting a delay requirement.

Figure 4:
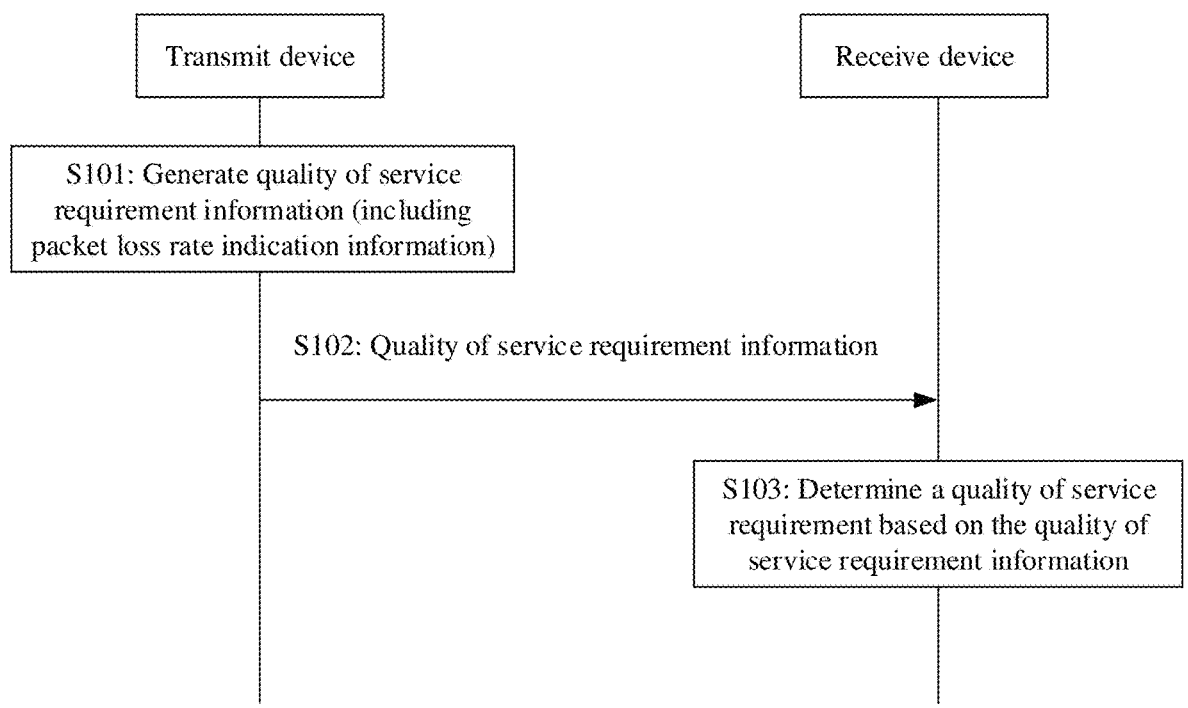
FIG. 4 is a schematic flowchart of a service indication method in accordance with one or more embodiments.

FIG. 4 is a schematic flowchart of a service indication method in accordance with one or more embodiments. The method may include the following steps.

S101: The transmit device generates the quality of service requirement information. The quality of service requirement information includes the packet loss rate indication information.

A service may be a low-delay service. The transmit device sends a traffic specification element to the receive device, to notify the receive device of quality of service requirement information of the low-delay service. For a wireless system, it is difficult to ensure a zero packet loss rate while meeting a delay requirement, but the packet loss rate may be minimized while meeting a low delay. In some embodiments, the quality of service requirement information further includes the packet loss rate indication information. The packet loss rate indication information indicates acceptable maximum packet loss information. The transmit device is one transmit device in a multi-link transmit device. The receive device is one receive device in a multi-link receive device. For example, the transmit device may be an AP, and the receive device is a STA. Alternatively, the transmit device may be a STA, and the receive device is an AP.

As shown in FIG. 5, the traffic specification element corresponding to the quality of service requirement information includes the following elements.

Element identifier: identifies an element. For example, the element identifier occupies one byte.

Length: indicates a number of bytes occupied by the element. For example, the length occupies one byte.

Traffic identifier bitmap: indicates a traffic identifier (TID) corresponding to the element. The TID may be 0 to 7, 0 to 15, or 8 to 15. For example, the traffic identifier bitmap occupies one byte.

Transmission direction: indicates a direction of a traffic stream. 00 indicates uplink, 10 indicates downlink, 01 indicates a direct link, and 11 indicates uplink and downlink. For example, the transmission direction occupies one byte.

Minimum service interval: indicates a minimum interval between any two service periods of the traffic stream. For example, the minimum service interval occupies four bytes.

Maximum service interval: indicates a maximum interval between any two service periods of the traffic stream. For example, the maximum service interval occupies four bytes.

Inactivity interval: indicates a minimum interval at which no data packet in the traffic stream arrives. For example, the inactivity interval occupies four bytes.

Suspension interval: indicates a minimum interval for suspending the traffic stream. For example, the suspension interval occupies four bytes.

Service start time: indicates start time of a service. For example, the service start time occupies four bytes.

Minimum data rate: indicates a minimum data rate corresponding to a location of a service access point at a media access control (MAC) layer. For example, the minimum data rate occupies four bytes.

Mean data rate: indicates a mean data rate corresponding to the location of the service access point at the MAC layer. For example, the mean data rate occupies four bytes.

Burst size: indicates a maximum burst size of the traffic stream. For example, the burst size occupies four bytes.

Delay bound: indicates an allowed maximum delay of the traffic stream. For example, the delay bound occupies four bytes.

Discard age: indicates a maximum validity period of a corresponding media access control service data unit (MSDU), and a transmit end needs to discard the MSDU when the validity period expires. For example, the discard age occupies two bytes.

In an implementation, the packet loss rate indication information includes an acceptable maximum number of lost packets and a reference number of service data packets. Therefore, the traffic specification element corresponding to the quality of service requirement information further includes the following elements.

Acceptable maximum number of lost packets (maximum discarded MSDU count): indicates an acceptable maximum number of lost packets of a corresponding low-delay service in a given maximum delay. For example, if the acceptable maximum number of lost packets occupies four bytes, a range of the acceptable maximum number of lost packets may be 0 to 232. In another example, the maximum number of lost packets may also be a maximum packet loss range. For example, correspondences between a plurality of maximum packet loss ranges and indexes are preset, and both the transmit device and the receive device store the correspondences. In this case, the acceptable maximum number of lost packets may be a value of the foregoing index. This can reduce signaling overheads.

An example of the correspondence between the maximum packet loss range and the index is shown in Table 1:

TABLE 1

| Index | Range of an acceptable maximum number of lost packets |
|---|---|
| 0 | 0 to 100 |
| 1 | 101 to 200 |
| ... | ... |

Reference number of service data packets (measurement count): indicates a reference measurement number for counting a packet loss rate, that is, a number of data packets actually sent by the transmit device. For example, if the reference number of service data packets may occupy four bytes, a range of the reference number of service data packets may be 0 to 232.

After receiving the acceptable maximum number of lost packets and the reference number of service data packets, the receive device may calculate an acceptable maximum packet loss rate of the transmit device: acceptable maximum number of lost packets/reference number of service data packets.

In another implementation, as shown in FIG. 6, the packet loss rate indication information includes an acceptable maximum packet loss rate and a reference number of service data packets. Therefore, the traffic specification element corresponding to the quality of service requirement information further includes the following elements.

Acceptable maximum packet loss rate (maximum discarded MSDU rate): indicates an acceptable maximum packet loss rate of a corresponding low-delay service in a given maximum delay. Acceptable maximum packet loss rate=acceptable maximum number of lost packets/reference number of service data packets. For example, correspondences between a plurality of maximum packet loss rates and indexes may be preset, and both the transmit device and the receive device store the correspondences. In this case, the acceptable maximum packet loss rate may be a value of the foregoing index.

An example of the correspondence between the acceptable maximum packet loss rate and the index is shown in Table 2:

TABLE 2

| Index | Acceptable maximum packet loss rate |
|---|---|
| 0 | 5% |
| 1 | 10% |
| ... | ... |

Reference number of service data packets: A meaning of the reference number is the same as that described above.

The receive device may calculate an actual packet loss rate based on the reference number of service data packets and a number of actually received service data packets, and then determine whether the actual packet loss rate is within the foregoing acceptable maximum packet loss rate.

Further, the traffic specification element corresponding to the quality of service requirement information may further include triggered reporting parameters.

Indication information (triggered report enable) indicating whether to enable triggering, based on the average packet loss rate, sending the quality of service requirement information: indicates whether to enable triggering a measurement report based on the average packet loss rate. For example, the indication information occupies 1 bit. If a value of the 1 bit is "1", it indicates that triggering the measurement report based on the average packet loss rate is enabled. If a value of the 1 bit is "0", it indicates that triggering the measurement report based on the average packet loss rate is disabled. That triggering the measurement report based on the average packet loss rate is disabled means that the transmit device sends the measurement report to the receive device only when receiving a request sent by the receive device.

Threshold of the average packet loss rate (discarded threshold): indicates a threshold of the average packet loss rate for triggering the measurement report. The threshold is generally smaller than the acceptable maximum number of lost packets. For example, when the indication information indicating whether to enable triggering, based on the average packet loss rate, sending the quality of service requirement information indicates disabling triggering the measurement report based on the average packet loss rate, a bit corresponding to the threshold of the average packet loss rate may be reserved or not present.

Basic delay range (Bin 0 range): indicates a delay range of a first bin (Bin 0) in a transmit delay histogram, that is, a number of MSDUs whose delays are greater than or equal to 0 and less than B0. Another bin (Bin i) is obtained based on the basic delay range.

Further, the traffic specification element corresponding to the quality of service requirement information may further include the following elements.

Indication information indicating whether a service is a high-reliability service: further indicates whether the low-delay service is a high-reliability service. The high-reliability service has a higher requirement on a low delay. For example, the indication information may be 1 bit. For example, if a value of the 1 bit is "1", it indicates that the service is a high-reliability service. If a value of the 1 bit is "0", it indicates that the service is not a high-reliability service.

Maximum delay jitter of a service: indicates that the transmit device requires that delay jitter of the low-delay service cannot exceed the maximum delay jitter. The maximum delay jitter of the service may be indicated by several bits.

Indication information indicating whether to use a backup transmission mode: indicates whether the transmit device and/or the receive device use/uses the backup transmission mode. The backup transmission mode means that for an MSDU, before the transmit device does not receive a successful reception response (ACK) from the receive device, a plurality of backups of the MSDU may be transmitted over one or more links. Alternatively, before the receive device does not receive an ACK from the transmit device, a plurality of backups of the MSDU may be transmitted over one or more links. For example, the indication information may be 1 bit. For example, if a value of the 1 bit is "1", it indicates that the backup transmission mode may be used. If a value of the 1 bit is "0", it indicates that the backup transmission mode is not used.

Indication information indicating an expected channel access manner: The expected channel access manner may be enhanced distributed channel access ( ) or trigger-based uplink (trigger-based link) channel access. The EDCA is a relatively common random access manner. The trigger-based uplink channel access means that the transmit device sends a trigger indication, and the receive device sends uplink data. The indication information may be 1 bit, and a correspondence between a bit value of the indication information and an expected channel access manner may be as follows: "0" indicates that the expected channel access manner is EDCA, and "1" indicates that the expected channel access manner is trigger-based uplink channel access.

Indication information indicating whether a restricted service period needs to be established: The restricted service period means that in the restricted service period, only the low-delay service can be transmitted, and another service cannot be transmitted, to avoid interference caused by the another service to the low-delay service, and reduce a delay of the low-delay service. There are two manners of establishing the restricted service period. One manner is to establish the restricted service period by using target wake time (TWT), and the other manner is to establish the restricted service period by using a quiet element. The indication information may be 1 bit. If a value of the 1 bit is "1", it indicates that the restricted service period needs to be established. If a value of the 1 bit is "0", it indicates that the restricted service period does not need to be established.

S102: The transmit device sends the quality of service requirement information to the receive device.

S103: The receive device receives the quality of service requirement information, and determines a quality of service requirement based on the quality of service requirement information.

The receive device receives the quality of service requirement information, and parses and obtains the quality of service requirement information, to learn of the quality of service requirement of the receive device. Further, in a service transmission process, when the quality of service does not meet the quality of service requirement, feedback may be sent to the transmit device.

In some embodiments, in the service indication method, the transmit device generates the quality of service requirement information. The quality of service requirement information includes the packet loss rate indication information. The transmit device sends the quality of service requirement information to the receive device. Therefore, the receive device may determine, based on the quality of service requirement information, whether to agree on establishment of the low-delay service. If establishment of the low-delay service is agreed, the packet loss rate needs to be minimized while meeting the delay requirement.

To better meet a quality of service requirement of the low-delay service, the transmit device may send a quality of service measurement report to the receive device, to notify quality of service achieved by the current low-delay service. However, currently there is no solution for how the multi-link transmit device sends the quality of service measurement report in a multi-link scenario, and the multi-link receive device cannot determine quality of service of each of the plurality of links.

In view of this, this application provides a service indication solution. A multi-link transmit device includes quality of service information of a link and link indication information included in a quality of service measurement report. The link indication information indicates a plurality of links carrying services. The quality of service information of a link includes a number of media access control service data units lost on each of the plurality of links carrying services. Therefore, a peer end may accurately determine quality of service of each of the plurality of links based on the quality of service measurement report. This improves reliability of service transmission.

Figure 7:
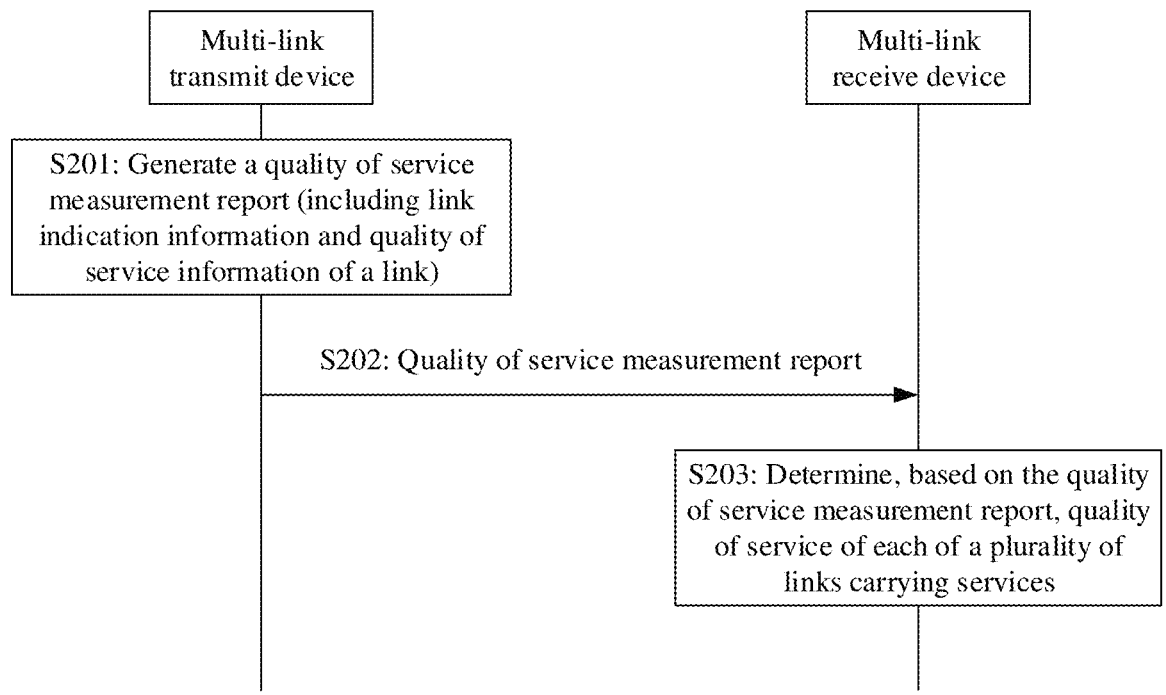
FIG. 7 is a schematic flowchart of another service indication method in accordance with one or more embodiments.

FIG. 7 is a schematic flowchart of another service indication method in accordance with one or more embodiments. The method may include the following steps.

S201: The multi-link transmit device generates the quality of service measurement report.

A plurality of links are used to carry or transmit services. This can reduce a packet delay of the service. In a service transmission process, the multi-link transmit device obtains the quality of service of each of the plurality of links carrying services, and generates the quality of service measurement report.

In some embodiments, the quality of service measurement report includes the link indication information and the quality of service information of a link. The link indication information indicates the plurality of links carrying services. In a multi-link scenario, all links or some links may carry services. A plurality of links that actually carry services are indicated by the link indication information. The quality of service information of a link includes a number (MSDU lost count) of MSDUs lost on each of the plurality of links carrying services. The number of lost MSDUs is a number of MSDUs that are sent by the multi-link transmit device, but for which no successful reception response/block acknowledgement (/BA) sent by a multi-link receive end is received, or an ACK/BA is received but a reception error is displayed.

In an implementation, as shown in FIG. 8, the link indication information includes a number (number of links) of the plurality of links carrying services and a link identifier (link ID) of each of the plurality of links carrying services.

Therefore, the quality of service measurement report includes:

Number of the plurality of links carrying services: indicates a number of links that currently carry a low-delay service.

Link identifier of each of the plurality of links carrying services: is a link identifier corresponding to the MSDU lost count.

Number (MSDU lost count) of MSDUs lost on each of the plurality of links carrying services included in the quality of service information of a link: If the number of the plurality of links carrying services is N, there are N lost MSDUs. N is a positive integer.

Further, the quality of service measurement report further includes:

Element identifier (element ID): identifies an element. For example, the element identifier occupies one byte.

Length: indicates a number of bytes occupied by the element. For example, the length occupies one byte.

Traffic identifier bitmap: indicates a traffic identifier (TID) corresponding to the element. The TID may be 0 to 7, 0 to 15, or 8 to 15. For example, the traffic identifier bitmap occupies one byte.

Actual measurement start time of the quality of service measurement report: is a moment when a trigger condition is met if the measurement report is triggered. For example, the actual measurement start time may be a timing synchronization function (TSF) value at a trigger moment. That the trigger condition is met means that sending the measurement report is triggered when an actual average packet loss rate is greater than or equal to a threshold of the average packet loss rate in the foregoing embodiment.

Total number of media access control service data units successfully sent on the plurality of links carrying services (transmitted MSDU count): is a number of MSDUs that are successfully sent by the multi-link transmit device and for which an ACK/BR sent by the multi-link receive device is received.

Total number of media access control service data units discarded on the plurality of links carrying services (MSDU discarded count): is a number of MSDUs discarded by the multi-link transmit device due to timeout or a fact that a number of retransmissions is exceeded.

Total number of media access control service data units unsuccessfully sent on the plurality of links carrying services (MSDU failed count): is a number of MSDUs discarded by the multi-link transmit device due to a fact that a number of retransmissions is exceeded.

Total number of media access control service data units retransmitted for a plurality of times on the plurality of links carrying services (MSDU multiple retry count): is a number of MSDUs that are successfully transmitted by the multi-link transmit device and that are retransmitted more than once.

Average transmit delay of the plurality of links carrying services: is an average value of a sum of delays of all of the plurality of links carrying services. The average transmit delay represents a transmit delay of the multi-link transmit device.

Number of times of receiving no acknowledgement on each of the plurality of links carrying services: is a number of ACK/BR failures on each of the plurality of links carrying services.

Number of times of receiving an overlapping basic service set (OBSS) frame on each of the plurality of links carrying services.

Channel load of each of the plurality of links carrying services: for example, a proportion of busy channels on each of the plurality of links carrying services.

Basic delay range: indicates a delay range of a first bin (Bin 0) in a transmit delay histogram, that is, a number of MSDUs whose delays are greater than or equal to 0 and less than B0.

Total number of media access control service data units on the plurality of links carrying services within at least one delay range, that is, Bin i: a number of MSDUs whose delays are greater than or equal to $2^{(i-1)}*B0$ and less than $2^i*B0$. Bin i is obtained based on the foregoing basic delay range. In FIG. 8, i ranges from 1 to 5.

All the foregoing parameters in the quality of service measurement report may represent quality of service of a plurality of links that carry the low-delay service. The quality of service measurement report may include the foregoing parameters, or may include some of the plurality of parameters.

Figure 9:
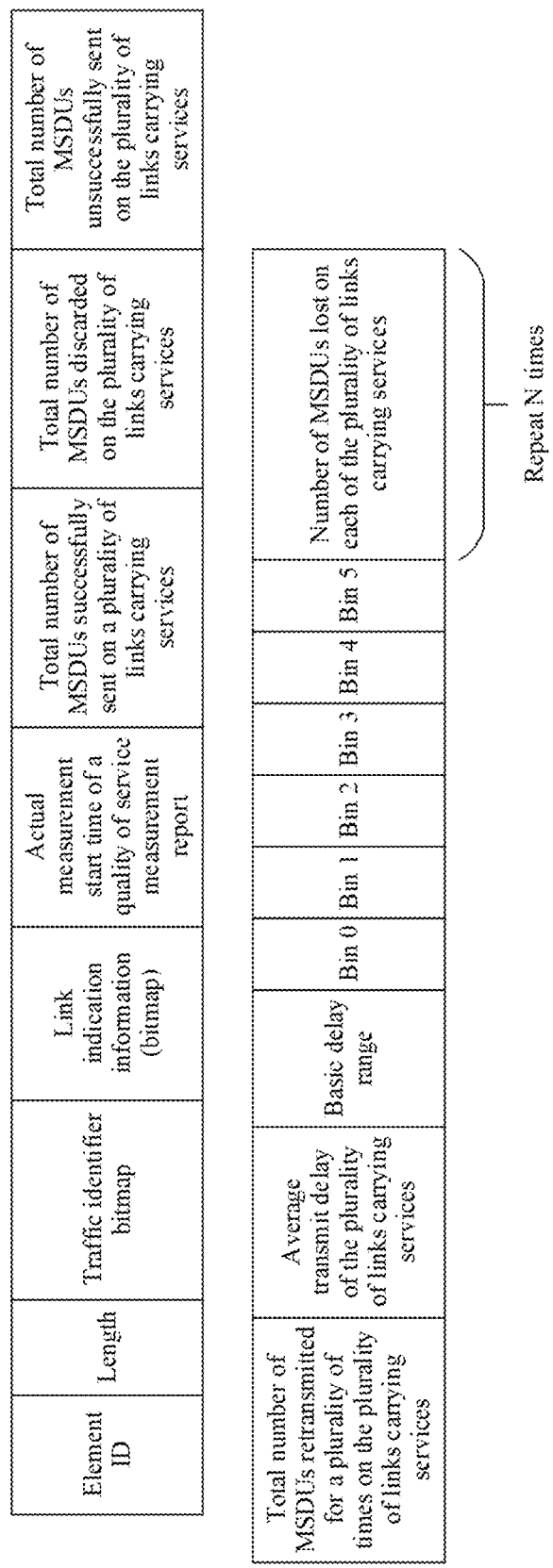
FIG. 9 is a schematic diagram of a format of yet another traffic specification element in accordance with one or more embodiments.

In another implementation, FIG. 9 is a schematic diagram of a format of another quality of service measurement report. Different from FIG. 8, in FIG. 9, the quality of service measurement report includes:

Link indication information: is implemented by using a bitmap. A first value of the bitmap indicates the plurality of links carrying services. For example, the multi-link scenario includes five links in total: a link 1 to a link 4. A bit value "1" of the bitmap indicates a link carrying a service. If the bitmap of the link indication information is "11001", it indicates that the link 1, a link 2, and a link 5 are links carrying services.

Number of MSDUs lost on each link of the plurality of links carrying services: has a same meaning as that described in FIG. 8. The corresponding bitmap is "11001". The MSDU lost count is repeated for three times.

Another parameter included in the quality of service measurement report may be the same as that described in FIG. 8.

For example, the quality of service measurement report is included in an element.

The multi-link transmit device may also measure another parameter, and a measurement report of the parameter is carried in an element for sending.

S202: The multi-link transmit device sends the quality of service measurement report to the multi-link receive device.

The multi-link transmit device may send the quality of service measurement report to the multi-link receive device by using any link that carries a service, or may send the quality of service measurement report through a link that does not carry a service.

S203: The multi-link receive device receives the quality of service measurement report, and determines, based on the quality of service measurement report, quality of service of each of the plurality of links carrying services.

After receiving the quality of service measurement report, the multi-link receive device may obtain the quality of service of each of the plurality of links carrying services. If quality of service of the low-delay service is poor, a link that causes the poor quality of service of the low-delay service may be accurately determined.

Further, after the multi-link receive device determines the quality of service of each of the plurality of links carrying services, a corresponding operation may be performed on a link whose quality of service is lower than a quality of service requirement of the low-delay service, to further improve the quality of service of the low-delay service carried on the link. In one manner, APs may choose to negotiate mapping (TID-to-link) between a traffic identifier and a link, so that a plurality of links correspond to one TID, to reduce a delay of the service. In another manner, a corresponding restricted service period is established for the link whose quality of service is lower than the quality of service requirement of the low-delay service, so that only the low-delay service can be transmitted in the restricted service period, to avoid interference caused by another service to the low-delay service, or the like.

For TID-to-link mapping negotiation, TID-to-link mapping is used to indicate whether each link is enabled (enable) or disabled (disable). For example, if no TID is mapped to a link, the link is disabled. On the contrary, if any TID is mapped to the link, the link is enabled, and an AP MLD and a non-AP MLD can perform transmission through the enabled link.

For TID-to-link mapping negotiation, a responder can respond in any one of the following manners:

Manner 1: If a TID-to-link mapping indication only includes disabling of one or more links, the responder needs to accept this TID-to-link mapping scheme or these links are disabled.

Manner 2: If a TID-to-link mapping indication only includes enabling of one or more links, the responder may accept or reject this TID-to-link mapping scheme.

Manner 3: If a TID-to-link mapping indication includes disabling of one or more links and enabling of one or more links, the responder may accept or reject this TID-to-link mapping scheme.

In addition, for Manner 1 to Manner 3, if the TID-to-link mapping indication includes disabling of one or more links, optionally, a requester indicates whether this disabling operation is mandatory, that is, asks whether the responder needs to disable the link.

Alternatively, corresponding to Manner 3, for TID-to-link mapping negotiation, if the TID-to-link mapping indication includes disabling of one or more links and enabling of one or more links, optionally, the requester indicates whether this disabling operation is mandatory, that is, asks whether the responder needs to disable the link.

In some embodiments, in another service indication method, the multi-link transmit device includes the quality of service information of a link and the link indication information in the quality of service measurement report. The link indication information indicates the plurality of links carrying services. The quality of service information of a link includes the number of media access control service data units lost on each of the plurality of links carrying services. Therefore, the peer end may accurately determine the quality of service of each of the plurality of links based on the quality of service measurement report. This improves reliability of service transmission.

Figure 10:
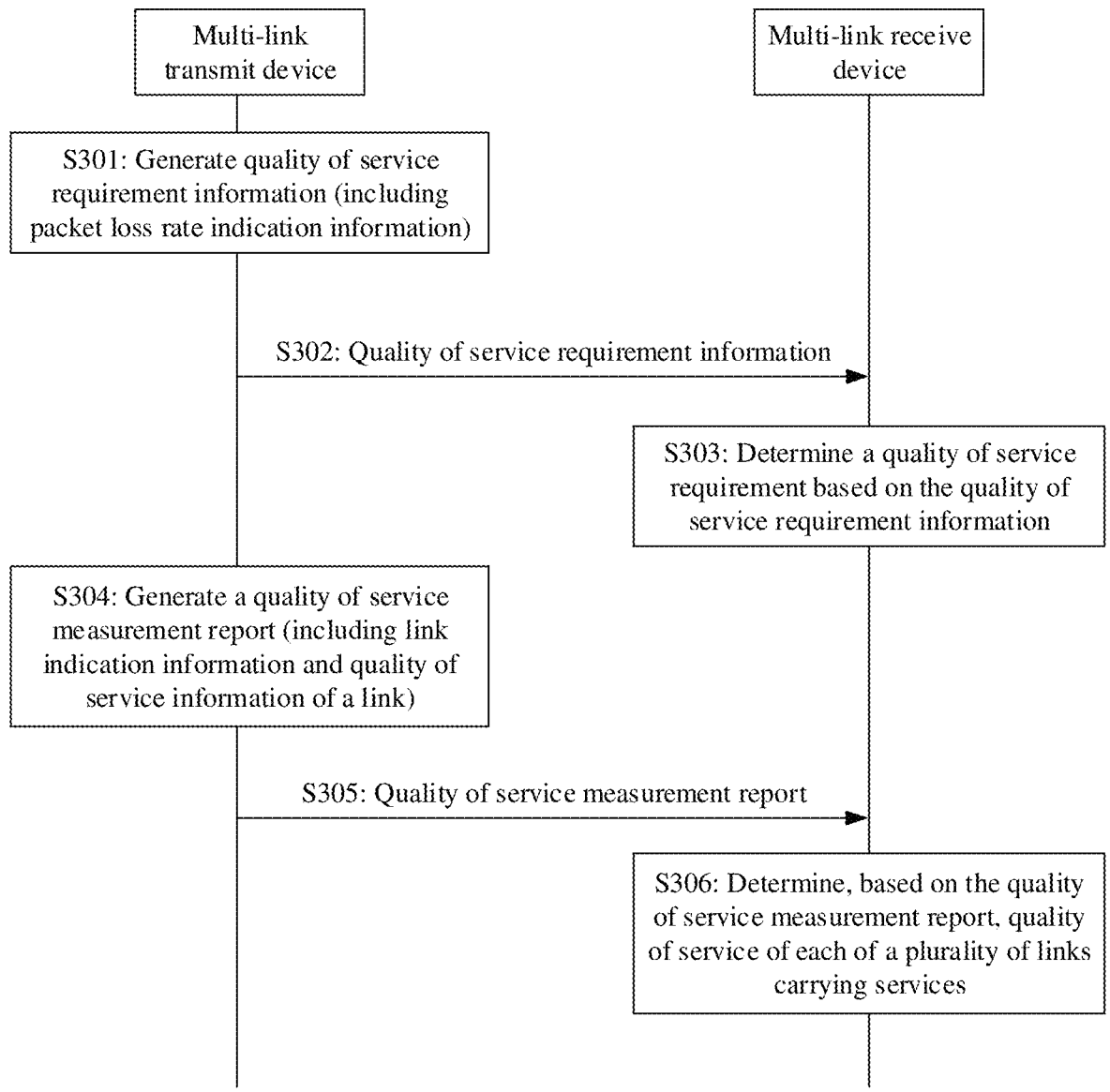
FIG. 10 is a schematic flowchart of still another service indication method in accordance with one or more embodiments.

FIG. 10 is a schematic flowchart of still another service indication method in accordance with one or more embodiments. The method may include the following steps.

S301: A multi-link transmit device generates quality of service requirement information. The quality of service requirement information includes packet loss rate indication information.

A plurality of links are used to carry or transmit services. This can reduce a packet delay of the service. In some embodiments, the multi-link transmit device generates quality of service requirement information of the service. The service is carried on a plurality of links. For specific implementation of generating the quality of service requirement information, refer to the step S101 in the embodiment shown in FIG. 4.

S302: The multi-link transmit device sends the quality of service requirement information to a multi-link receive device.

The multi-link transmit device sends the quality of service requirement information to the multi-link receive device by using any link.

S303: The multi-link receive device receives the quality of service requirement information, and determines a quality of service requirement based on the quality of service requirement information.

Different from the foregoing embodiments, in some embodiments, to better meet a quality of service requirement of a low-delay service, after the multi-link transmit device sends the quality of service requirement information, the multi-link transmit device may further obtain quality of service of each link, and send a quality of service measurement report to the multi-link receive device, so that the multi-link receive device can understand the quality of service of each link.

S304: The multi-link transmit device generates the quality of service measurement report.

The quality of service measurement report includes link indication information and quality of service information of a link. The link indication information indicates a plurality of links carrying services. The quality of service information of a link includes a number of media access control service data units lost on each of the plurality of links carrying services.

For specific implementation of this step, refer to the step S201 in the embodiment shown in FIG. 7.

S305: The multi-link transmit device sends the quality of service measurement report to the multi-link receive device.

For specific implementation of this step, refer to the step S202 in the embodiment shown in FIG. 7.

S306: The multi-link receive device receives the quality of service measurement report, and determines, based on the quality of service measurement report, quality of service of each of the plurality of links carrying services.

For specific implementation of this step, refer to the step S203 in the embodiment shown in FIG. 7.

Further, after the multi-link receive device determines the quality of service of each of the plurality of links carrying services, a corresponding operation may be performed on a link whose quality of service is lower than a quality of service requirement of the low-delay service, to further improve quality of service of the low-delay service carried on the link. In one manner, APs may choose to negotiate mapping (TID-to-link) between a traffic identifier and a link, so that a plurality of links correspond to one TID, to reduce a delay of the service. In another manner, a corresponding restricted service period is established for the link whose quality of service is lower than the quality of service requirement of the low-delay service, so that only the low-delay service can be transmitted in the restricted service period, to avoid interference caused by another service to the low-delay service, or the like.

In some embodiments, in the service indication method, the multi-link transmit device generates the quality of service requirement information. The quality of service requirement information includes the packet loss rate indication information. The multi-link transmit device sends the quality of service requirement information to the multi-link receive device. Therefore, the multi-link receive device may determine, based on the quality of service requirement information, whether to agree on establishment of the low-delay service. If establishment of the low-delay service is agreed, a packet loss rate needs to be minimized while meeting a delay requirement. In addition, the multi-link transmit device includes the quality of service information of a link and the link indication information in the quality of service measurement report. The link indication information indicates the plurality of links carrying services. The quality of service information of a link includes the number of media access control service data units lost on each of the plurality of links carrying services. Therefore, a peer end may accurately determine the quality of service of each of the plurality of links based on the quality of service measurement report.

FIG. 11 is a schematic flowchart of yet another service indication method in accordance with one or more embodiments. The method may include the following steps.

S401: A multi-link transmit device sends a measurement request to a multi-link receive device. Correspondingly, the multi-link receive device receives the measurement request. The measurement request includes link indication information of a link requested to be measured.

Currently, a plurality of radio measurement request types are defined, for example, channel load measurement and clear channel assessment (CCA) measurement. The radio measurement request is used to request to measure a channel load, perform clear channel assessment, or the like.

For a multi-link scenario, in one manner, radio measurement request/response frame interaction may be performed once on each link, to measure each link. However, signaling overheads in this manner are high.

In some embodiments, the link indication information of a link requested to be measured is carried in the measurement request. The link indication information indicates a link requested to be measured.

A subelement is carried in a measurement request element. The subelement includes the link indication information of a link requested to be measured.

As shown in FIG. 12, the measurement request element includes an element identifier, an element length, and measurement request information. In some embodiments, the measurement request element further includes a subelement. The subelement includes a subelement identifier, a subelement length, a link identifier list of a link requested to be measured, or a link bitmap of a link requested to be measured. The link identifier list of a link requested to be measured includes identifiers of all links requested to be measured. If N bits in the link bitmap are set to "1" (this value is merely an example, and the N bits may also be set to "0" to indicate a same meaning), it indicates that the measurement request needs to be executed on all corresponding links.

S402: The multi-link receive device sends a measurement response to the multi-link transmit device. Correspondingly, the multi-link transmit device receives the measurement response. The measurement response includes measurement report information of the link indicated by the link indication information.

After receiving the measurement request, the multi-link receive device performs, based on links that are requested to be measured and that are indicated by the link indication information, corresponding types of measurement on these links. For example, if the link identifier list of a link requested to be measured includes a link 1, a link 2, and a link 5, and the measurement type is channel load measurement, the multi-link receive device measures channel loads of the link 1, the link 2, and the link 5, and sends a measurement response to the multi-link transmit device. The measurement response includes channel load measurement results of the link 1, the link 2, and the link 5.

Alternatively, after receiving the measurement request, the multi-link receive device determines, based on link identifiers and link bitmaps of a plurality of links, links requested to be measured, and performs corresponding types of measurement on these links. For example, if the plurality of links include a link 1 to a link 5, the link bitmap is "11001", and the measurement type is channel load measurement, the multi-link receive device determines to measure channel loads of the link 1, the link 2, and the link 5, and sends a measurement response to the multi-link transmit device. The measurement response includes channel load measurement results of the link 1, the link 2, and the link 5.

FIG. 13 is a schematic diagram of a format of a measurement response element. The measurement response element includes an element identifier, an element length, and measurement report information. If there are N links requested to be measured, there are N measurement response elements.

QoS measurement may be performed on a stream classification service identifier (SCSID) by using a transmit stream (transmit stream)/category request/report (category request/report) defined in a current protocol and combining with a newly defined indication rule.

In an example, an AP or an AP MLD sends a spectrum measurement request frame or a radio measurement request frame (, to request a STA or a non-AP MLD to perform transmit stream/category measurement.

FIG. 14 is a schematic diagram of a frame format of the spectrum measurement request frame, and includes:
  a category, which occupies one byte;
  a spectrum management action, which occupies one byte;
  a dialog token, which occupies one byte; and
  a measurement request element, whose bytes are variable.

A format of the measurement request element is shown in FIG. 15, and includes:
  an element identifier, which occupies one byte;
  an element length, which occupies one byte;
  a measurement token, which occupies one byte;
  a measurement request mode, which occupies one byte;
  a measurement type, which occupies one byte; and
  a measurement request, whose bytes are variable.

The measurement type is set to an index number corresponding to transmit stream/category measurement. When the measurement type is set to the index number corresponding to the transmit stream/category measurement, a format of the measurement request is shown in FIG. 16, and includes:
  a randomization interval, which occupies two bytes;
  measurement duration, which occupies two bytes;
  a peer station address (peer STA address), which occupies six bytes;
  a traffic identifier (TID), which occupies one byte;
  a bin 0 range (Bin 0 range), which occupies one byte; and
  optional subelements, whose bytes are variable.

A format of a traffic identifier field is shown in FIG. 17. If B0 is 1, it indicates that a traffic stream corresponding to an SCSID is measured, and a value of the SCSID is carried in the traffic identifier field. If B0 is 0, it indicates that a traffic stream or a traffic category corresponding to a TID is measured.

When the STA or the non-AP MLD receives the spectrum measurement request frame based on the transmit stream/category measurement, a corresponding type of measurement is performed on a traffic stream corresponding to an SCSID, or a traffic stream or a traffic category corresponding to a TID. The STA or the non-AP MLD sends a spectrum measurement response frame to the AP or the AP MLD. A format of the spectrum measurement response frame is shown in FIG. 18, and includes:
  a category, which occupies one byte;
  a spectrum management action, which occupies one byte;
  a dialog token, which occupies one byte; and
  a measurement report element, which has a variable number of bytes.

A format of the measurement report element is shown in FIG. 19, and includes:
  an element identifier, which occupies one byte;
  an element length, which occupies one byte;
  a measurement token, which occupies one byte;
  a measurement report mode, which occupies one byte, and includes delay (late), incapable, refused, and reserved bits, which respectively occupy 1 bit, 1 bit, 1 bit, and 5 bits;
  a measurement type, which occupies one byte; and
  a measurement report, which has a variable number of bytes.

When the measurement type is set to the index number corresponding to the transmit stream/category measurement, a format of the measurement report is shown in FIG. 20, and includes:
  actual measurement start time, measurement duration, a peer STA address, a TID, a reporting reason, a transmitted MSDU count, an MSDU discarded count, an MSDU failed count, an MSDU multiple retry count, a quality of service CF-Polls lost count, an average transmit delay, a Bin 0 range, Bin 0, Bin 1, Bin 2, Bin 3, Bin 4, Bin 5, and optional subelements.

If B0 of a TID field is 1, it indicates that a traffic stream corresponding to an SCSID is measured, and a value of the SCSID is carried in the traffic identifier field. If B0 is 0, it indicates that a traffic stream or a traffic category corresponding to a TID is measured.

Therefore, the TID field in the transmit stream/category measurement request/report is redefined, so that an existing transmit stream/category measurement request/report may be reused to measure a traffic stream of an SCSID.

In another example, an AP or an AP MLD sends a spectrum measurement request frame or a radio measurement request frame, to request a STA or a non-AP MLD to perform transmit stream/category measurement.

A frame format of the spectrum measurement request frame is shown in FIG. 14.

A format of the measurement request element is shown in FIG. 15.

The measurement type is set to an index number corresponding to transmit stream/category measurement. When the measurement type is set to the index number corresponding to the transmit stream/category measurement, a format of the measurement request is shown in FIG. 16.

Figure 21:
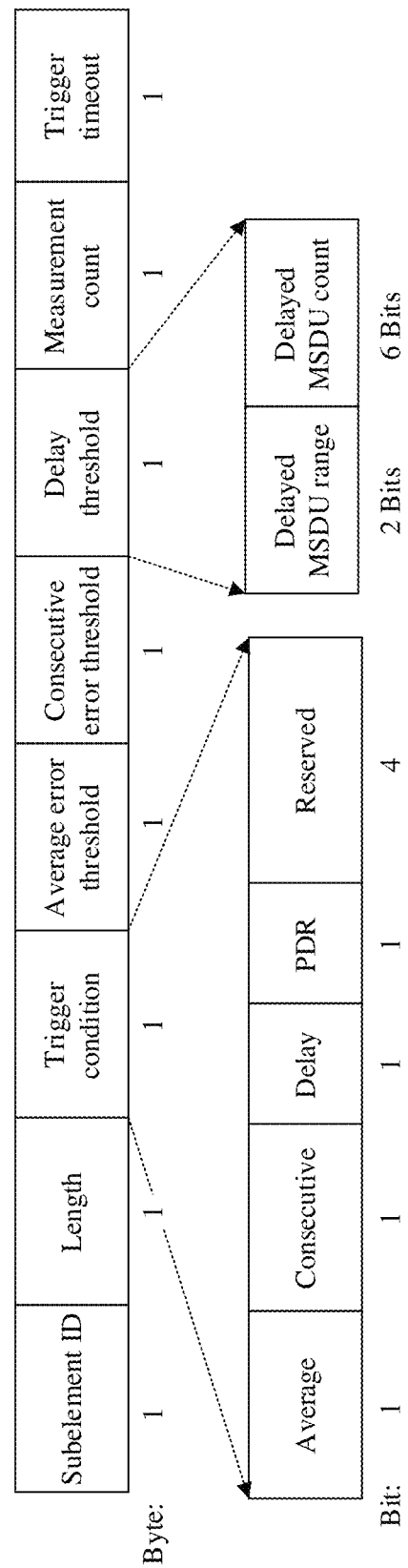
FIG. 21 is a schematic diagram of a format of a triggered reporting subelement in accordance with one or more embodiments.

For an optional subelement in the measurement request, when the optional subelement includes a triggered reporting subelement, a format of the triggered reporting subelement is shown in FIG. 21, and includes:
  a subelement identifier, which occupies one byte;
  a subelement length, which occupies one byte;
  a trigger condition, which occupies one byte;
  an average error threshold, which occupies one byte;
  a consecutive error threshold, which occupies one byte;
  a delay threshold, which occupies one byte, and includes a delayed MSDU range and a delayed MSDU count;
  a measurement count, which occupies one byte; and
  trigger timeout, which occupies one byte.

The trigger condition further includes:
  average, which occupies 1 bit;

consecutive, which occupies 1 bit;
a delay, which occupies 1 bit;
a packet delivery ratio (PDR), which occupies 1 bit; and
a reserved bit, which occupies 4 bits.

That is, for the triggered reporting subelement, the PDR is newly added to a trigger condition field, to indicate that PDR-based triggered reporting is requested.

When the optional subelement carries the triggered reporting subelement and a traffic identifier field carries an SCSID (that is, B0 in the traffic identifier field is set to 1), if a bit of the PDR in the trigger condition is set to 1, other fields other than a trigger conditions field, a trigger timeout field, and an MSDU count field in the triggered reporting subelement are all reserved fields.

When the STA or the non-AP MLD receives the spectrum measurement request frame based on transmit stream/category measurement, a corresponding type of measurement is performed on a traffic stream corresponding to an SCSID, or a traffic stream or a traffic category corresponding to a TID. The STA or the non-AP MLD sends a spectrum measurement response frame to the AP or the AP MLD. A format of the spectrum measurement response frame is shown in FIG. 18.

A format of the measurement report element is shown in FIG. 19.

Figure 22:
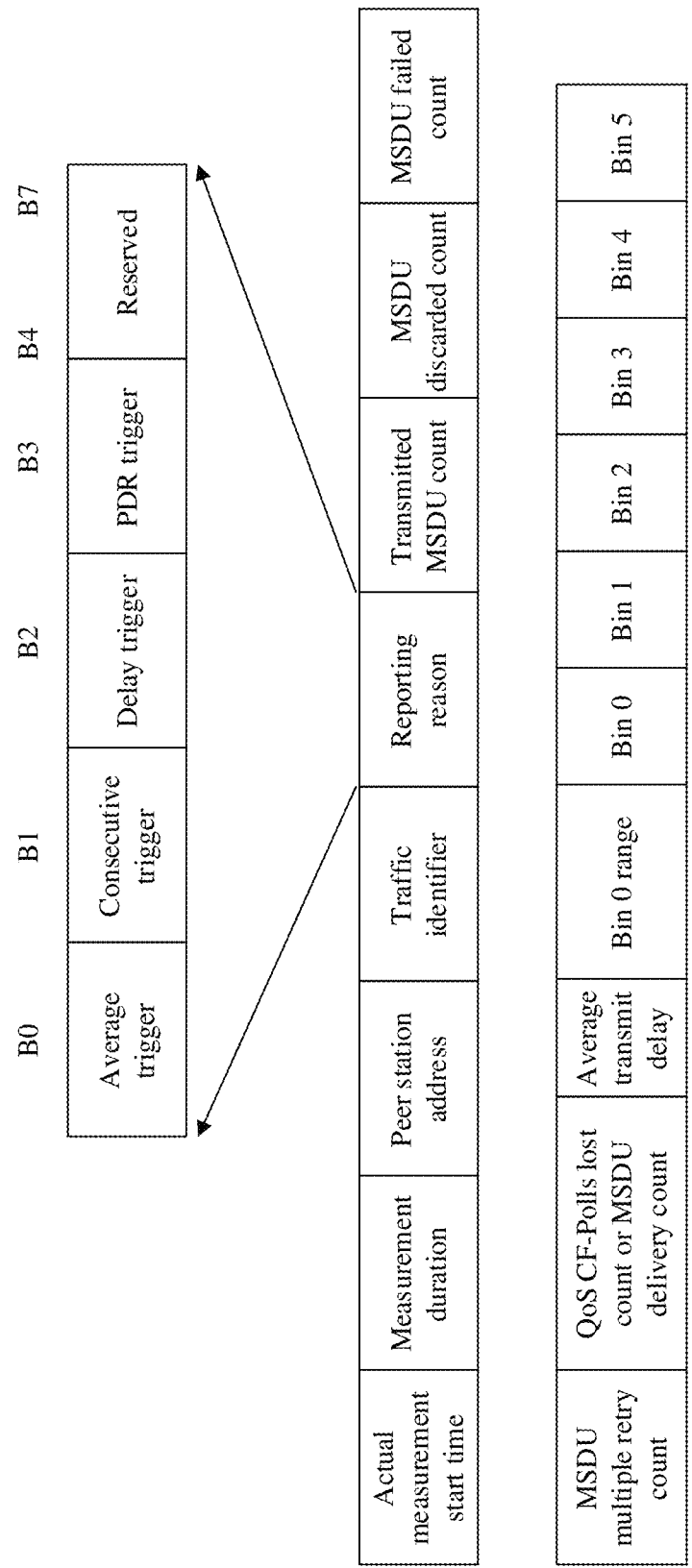
FIG. 22 is a schematic diagram of a format of another measurement report in accordance with one or more embodiments.

When the measurement type is set to the index number corresponding to the transmit stream/category measurement, a format of the measurement report is shown in FIG. 22, and includes:
actual measurement start time, measurement duration, a peer STA address, a TID, a reporting reason, a transmitted MSDU count, an MSDU discarded count, an MSDU failed count, an MSDU multiple retry count, a quality of service CF-Polls lost count or MSDU delivery count (QoS CF-Polls lost count or MSDU delivery count), an average transmit delay, a Bin 0 range, Bin 0, Bin 1, Bin 2, Bin 3, Bin 4, Bin 5, and optional subelements.

The reporting reason field further includes the following fields: average trigger, consecutive trigger, delay trigger, PDR trigger, and reserved fields. The PDR trigger field occupies one reserved bit, and indicates that a transmit stream/category measurement report is triggered because the PDR is less than a target value.

When the traffic identifier field carries the SCSID, a QoS CF-Polls lost count field may be used to carry the MSDU delivery count, which indicates a number of MSDUs successfully sent by a transmit end within a required delay bound. The delay bound is carried in a corresponding TSPEC element.

In addition, when a station side is a non-AP MLD, a newly defined multi-link measurement report subelement may be carried in the transmit stream/category measurement report, to carry information about each related link (per-link) carrying the measured service. A format of the newly defined multi-link measurement report subelement is shown in FIG. 23, and includes:
a subelement identifier;
a subelement length;
a link bitmap, which indicates links on which the corresponding service can be transmitted;
a transmitted MSDU/MPDU count list, which indicates a number of transmitted MSDUs/MPDUs corresponding to the service on each link carrying the service; and
an MSDU/MPDU lost count list, which indicates a number of lost MSDUs/MPDUs corresponding to the service on each link carrying the service, that is, no ACK is received or the ACK is received but a reception failure is displayed.

Therefore, the TID field in the transmit stream/category measurement request/report is redefined, so that an existing transmit stream/category measurement request/report may be reused to measure a traffic stream of an SCSID.

In some embodiments, in the service indication method, the multi-link transmit device indicates, by carrying the link indication information of a link requested to be measured in the radio measurement request, the link requested to be measured, so that the multi-link receive device may measure, based on the link indication information, the link requested to be measured and report the measurement report. This avoids a case that measurement request/response frame interaction is performed once on each of a plurality of links, reduces signaling overheads, and improves measurement efficiency.

The foregoing describes the solutions provided in embodiments of this application. It may be understood that, to implement the foregoing functions, a service indication apparatus (for example, an AP, a STA, an AP MLD, or a non-AP MLD) includes corresponding hardware structures and/or software modules for performing the functions. A person skilled in the art should easily be aware that, in combination with units and algorithm steps of the examples described in embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, the service indication apparatus may be divided into functional modules based on the foregoing method examples. For example, each functional module may be obtained through division based on each corresponding function, or two or more functions may be integrated into one processing module. The functional module may be implemented in a form of hardware, or may be implemented in a form of a software functional module. It should be noted that, in embodiments of this application, module division is an example, and is merely a logical function division. During actual implementation, another division manner may be used. The following uses division of each functional module based on a corresponding function as an example for description.

A schematic diagram of a possible structure of a service indication apparatus is shown in FIG. 24. The service indication apparatus includes a processing unit and a transceiver unit.

In an embodiment, the service indication apparatus may be the transmit device described in FIG. 4. The processing unit is configured to support the service indication apparatus in performing the step S101 in the foregoing embodiment. The transceiver unit is configured to support the service indication apparatus in performing the step S102 in the foregoing embodiment. For all related content of each step involved in the foregoing method embodiments, refer to function descriptions of a corresponding functional module. Details are not described herein again.

In another embodiment, the service indication apparatus may be the receive device described in FIG. 4. The transceiver unit is configured to support the service indication apparatus in performing the step S102 in the foregoing embodiment. The processing unit is configured to support the service indication apparatus in performing the step S103 in the foregoing embodiment. For all related content of each step involved in the foregoing method embodiments, refer to function descriptions of a corresponding functional module. Details are not described herein again.

In another embodiment, the service indication apparatus may be the multi-link transmit device described in FIG. 7. The processing unit is configured to support the service indication apparatus in performing the step S201 in the foregoing embodiment. The transceiver unit is configured to support the service indication apparatus in performing the step S202 in the foregoing embodiment. For all related content of each step involved in the foregoing method embodiments, refer to function descriptions of a corresponding functional module. Details are not described herein again.

In still another embodiment, the service indication apparatus may be the multi-link receive device described in FIG. 7. The transceiver unit is configured to support the service indication apparatus in performing the step S202 in the foregoing embodiment. The processing unit is configured to support the service indication apparatus in performing the step S203 in the foregoing embodiment. For all related content of each step involved in the foregoing method embodiments, refer to function descriptions of a corresponding functional module. Details are not described herein again.

FIG. 25 is a structural diagram of a possible product form of a service indication apparatus in accordance with one or more embodiments.

In a possible product form of an embodiment, the service indication apparatus may be an information transmission device. The service indication apparatus includes a processor and a transceiver. The processor is configured to control and manage an action of the service indication apparatus, for example, configured to support the service indication apparatus in performing the step S101 in the foregoing embodiment, and/or configured to perform another technical process described in this specification. The transceiver is configured to support the service indication apparatus in performing the step S102 in the foregoing embodiment. Optionally, the service indication apparatus may further include a memory.

In another possible product form of an embodiment, the service indication apparatus may be an information transmission board. The service indication apparatus includes a processor and a transceiver. The processor is configured to control and manage an action of the service indication apparatus, for example, configured to support the service indication apparatus in performing the step S101 in the foregoing embodiment, and/or configured to perform another technical process described in this specification. The transceiver is configured to support the service indication apparatus in performing the step S102 in the foregoing embodiment. Optionally, the service indication board may further include a memory.

In a possible product form of another embodiment, the service indication apparatus may be an information transmission device. The service indication apparatus includes a processor and a transceiver. The processor is configured to control and manage an action of the service indication apparatus, for example, configured to support the service indication apparatus in performing the step S103 in the foregoing embodiment, and/or configured to perform another technical process described in this specification. The transceiver is configured to support the service indication apparatus in performing the step S102 in the foregoing embodiment. Optionally, the service indication apparatus may further include a memory.

In another possible product form of another embodiment, the service indication apparatus may be an information transmission board. The service indication board includes a processor and a transceiver. The processor is configured to control and manage an action of the service indication apparatus, for example, configured to support the service indication apparatus in performing the step S103 in the foregoing embodiment, and/or configured to perform another technical process described in this specification. The transceiver is configured to support the service indication apparatus in performing the step S102 in the foregoing embodiment. Optionally, the service indication board may further include a memory.

In a possible product form of still another embodiment, the service indication apparatus may be an information transmission device. The service indication apparatus includes a processor and a transceiver. The processor is configured to control and manage an action of the service indication apparatus, for example, configured to support the service indication apparatus in performing the step S201 in the foregoing embodiment, and/or configured to perform another technical process described in this specification. The transceiver is configured to support the service indication apparatus in performing the step S202 in the foregoing embodiment. Optionally, the service indication apparatus may further include a memory.

In another possible product form of still another embodiment, the service indication apparatus may be an information transmission board. The service indication board includes a processor and a transceiver. The processor is configured to control and manage an action of the service indication apparatus, for example, configured to support the service indication apparatus in performing the step S201 in the foregoing embodiment, and/or configured to perform another technical process described in this specification. The transceiver is configured to support the service indication apparatus in performing the step S202 in the foregoing embodiment. Optionally, the service indication board may further include a memory.

In a possible product form of yet another embodiment, the service indication apparatus may be an information transmission device. The service indication apparatus includes a processor and a transceiver. The processor is configured to control and manage an action of the service indication apparatus, for example, configured to support the service indication apparatus in performing the step S103 in the foregoing embodiment, and/or configured to perform another technical process described in this specification. The transceiver is configured to support the service indication apparatus in performing the step S102 in the foregoing embodiment. Optionally, the service indication apparatus may further include a memory.

In another possible product form of an embodiment, the service indication apparatus may be an information transmission board. The service indication board includes a processor and a transceiver. The processor is configured to control and manage an action of the service indication apparatus, for example, configured to support the service indication apparatus in performing the step S103 in the foregoing embodiment, and/or configured to perform another technical process described in this specification. The transceiver is configured to support the service indication apparatus in performing the step S102 in the foregoing embodiment. Optionally, the service indication board may further include a memory.

In still another possible product form of the foregoing embodiments, the service indication apparatus is also implemented by a general-purpose processor, that is, implemented by a commonly called chip. The general-purpose processor includes: a processing circuit and a communication interface. Optionally, the general-purpose processor may further include a storage medium.

In yet another possible product form of the foregoing embodiments, the service indication apparatus may alternatively be implemented by using the following: one or more field programmable gate arrays (FPGAs), a programmable logic device (PLD), a controller, a state machine, a logic gate, a discrete hardware component, any other suitable circuit, or any combination of circuits that can perform various functions described throughout this application.

The processor may be a central processing unit, a general-purpose processor, a digital signal processor, an application-specific integrated circuit, a field programmable gate array or another programmable logic device, a transistor logic device, a hardware component, or any combination thereof. The processor may implement or execute various example logical blocks, modules, and circuits described with reference to content disclosed in this application. Alternatively, the processor may be a combination of processors implementing a computing function, for example, a combination of one or more microprocessors, or a combination of the digital signal processor and a microprocessor. The bus may be a peripheral component interconnect (PCI) bus or an extended industry standard architecture (EISA) bus, or the like. The bus may be classified into an address bus, a data bus, a control bus, and the like. For ease of representation, only one thick line is for representing the bus in FIG. 8, but this does not mean that there is only one bus or only one type of bus.

A person of ordinary skill in the art may understand that all or some of the steps of the method embodiments may be implemented by hardware related to program instructions. The program instructions may be stored in a computer-readable storage medium. When the program instructions are run, the steps of the method embodiments are performed. The foregoing storage medium includes any medium that can store program code, such as a USB flash drive, a removable hard disk, a ROM, a RAM, a magnetic disk, or an optical disc.

In one aspect, an embodiment of this application further provides a readable storage medium. The readable storage medium stores computer-executable instructions, and when the computer-executable instructions are run, a device (which may be a single-chip microcomputer, a chip, a controller, or the like) or a processor is enabled to perform the steps in the service indication method provided in this application.

In one aspect, an embodiment of this application further provides a computer program product. The computer program product includes computer-executable instructions, and the computer-executable instructions are stored in a computer-readable storage medium. At least one processor of a device may read the computer-executable instructions from the computer-readable storage medium, and the at least one processor executes the computer-executable instructions, so that the device performs the steps in the service indication method provided in this application.

A client (for example, a STA) may send a stream classification service (SCS) request frame to a server (for example, an AP). The SCS request frame is used to request to add, to an associated AP, a low-delay service related to an application layer. The server sends an acknowledgement response (ACK) to the client, and then sends an SCS response frame. The SCS response frame is used to indicate that the SCS request frame is received, and indicate that the low-delay service is successfully or unsuccessfully added.

FIG. 26 is a schematic diagram of a format of the SCS request frame. The SCS request frame includes the following fields:
   a category, which indicates a category to which the request frame belongs;
   a robust action, which indicates which frame in the category;
   a dialog token; and
   an SCS descriptor list, which includes one or more SCS descriptors.

Figures 27, 28:
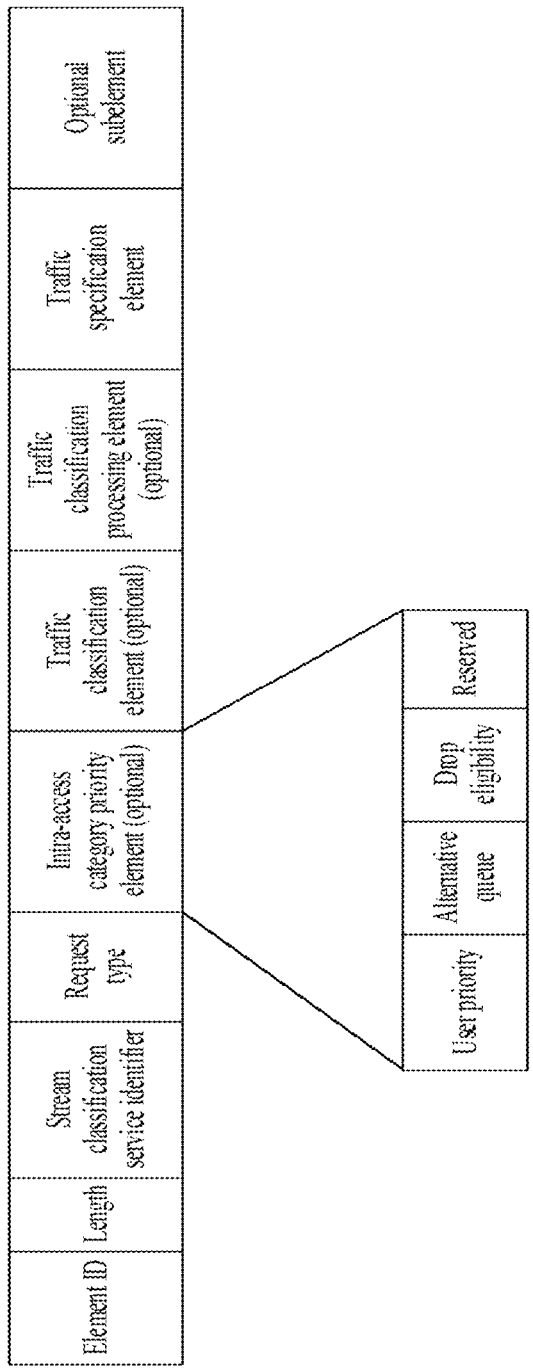
FIG. 27 is a schematic diagram of a format of an SCS descriptor in accordance with one or more embodiments.
FIG. 28 is a schematic diagram of a format of an SCS response frame in accordance with one or more embodiments.

FIG. 27 is a schematic diagram of a format of an SCS descriptor. The SCS descriptor includes the following fields or elements:
   an element identifier (element ID);
   a length;
   a stream classification service identifier (SCSID), where the stream classification service identifier includes one byte, and indicates an identifier allocated to an SCS flow; to reuse a transmit stream (transmit stream)/category request/report (category request/report) in an existing protocol, when allocating the SCSID, an EHT STA or a non-AP MLD always sets B0 in the TID field shown in FIG. 17 to 1, and it indicates that the field includes the SCSID (which occupies B0 to B7); and if B0 in the TID field is set to 0, it indicates that a TID is included in B3 to B7 in the field, therefore, different indications are implemented by reusing the TID field;
   a request type, which includes one byte, indicates a type of a request, and may be any one of request add, request remove, and request change;
   an intra-access category priority element, which is optional;
   a traffic classification element (TCLAS element), which is optional, indicates how to identify the SCS flow, and carries a criterion for determining the SCS flow;
   a traffic classification processing element (TCLAS processing element), which is optional, and indicates how to process a plurality of traffic classification elements when there are the plurality of traffic classification elements; and
   a traffic specification element (TSPEC element) or a newly defined element (for example, a TSPEC-lite element), which indicates information such as a QoS parameter of a corresponding SCS flow.

An optional subelement may be further included.

As shown in FIG. 27, the intra-access category priority element further includes the following fields:
   a user priority, which includes 3 bits, and indicates a priority of a user;
   an alternative queue, which includes 1 bit, and indicates whether to establish a new alternative queue for the SCS flow;
   drop eligibility, which includes 1 bit, and indicates whether a data packet of the SCS flow can be discarded when there is no sufficient resource; and
   a reserved field.

FIG. 28 is a schematic diagram of a format of the SCS response frame. The SCS response frame includes the following fields:

a category, which indicates a category to which the response frame belongs;

a robust action, which indicates which frame in the category;

a dialog token, which may be consistent with the dialog token in the corresponding SCS request frame; and an SCS status list, which includes one or more SCS status groups, and includes the following two subfields:

an SCS ID, which indicates an identifier of an SCS; and a status code, which indicates whether the requested SCS ID is accepted.

However, for a multi-link scenario, after the AP adds the low-delay service, the low-delay service may be carried on a plurality of links, but there is no related solution to enable the AP to obtain quality of service of each link that is of the STA and that carries the low-delay service.

Figure 29:
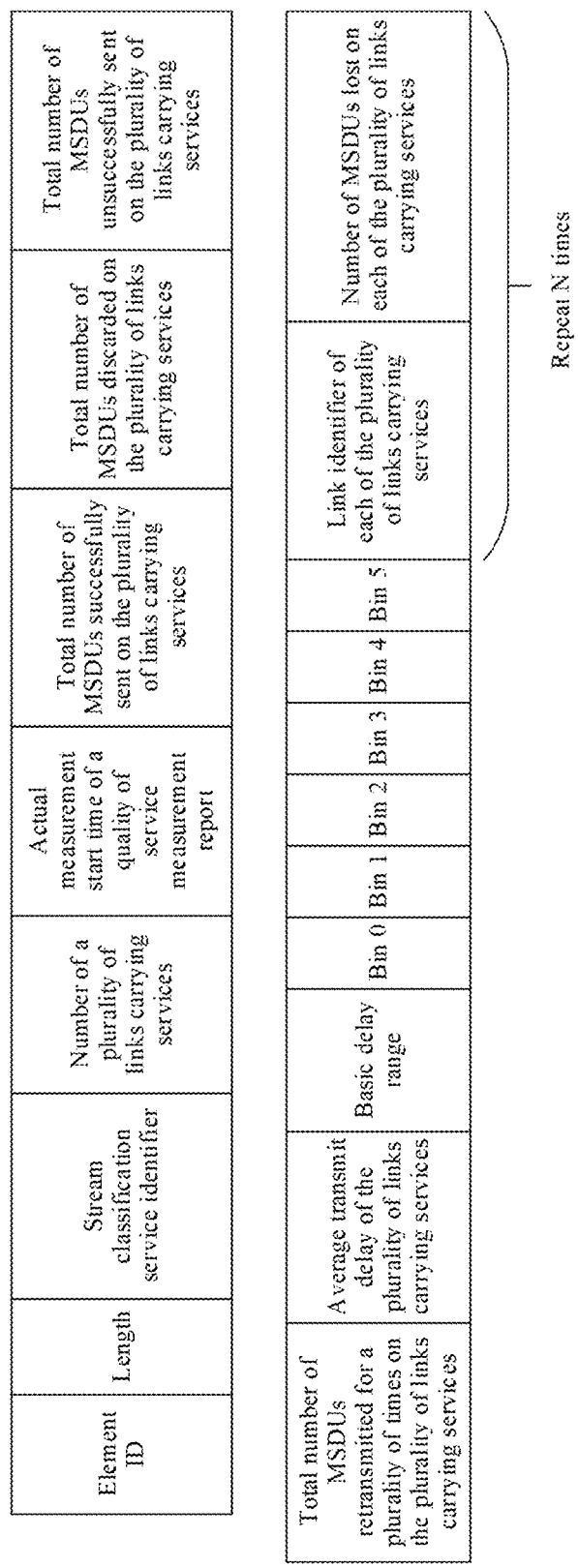
FIG. 29 is a schematic diagram of a format of still yet another traffic specification element in accordance with one or more embodiments.
Figure 30:
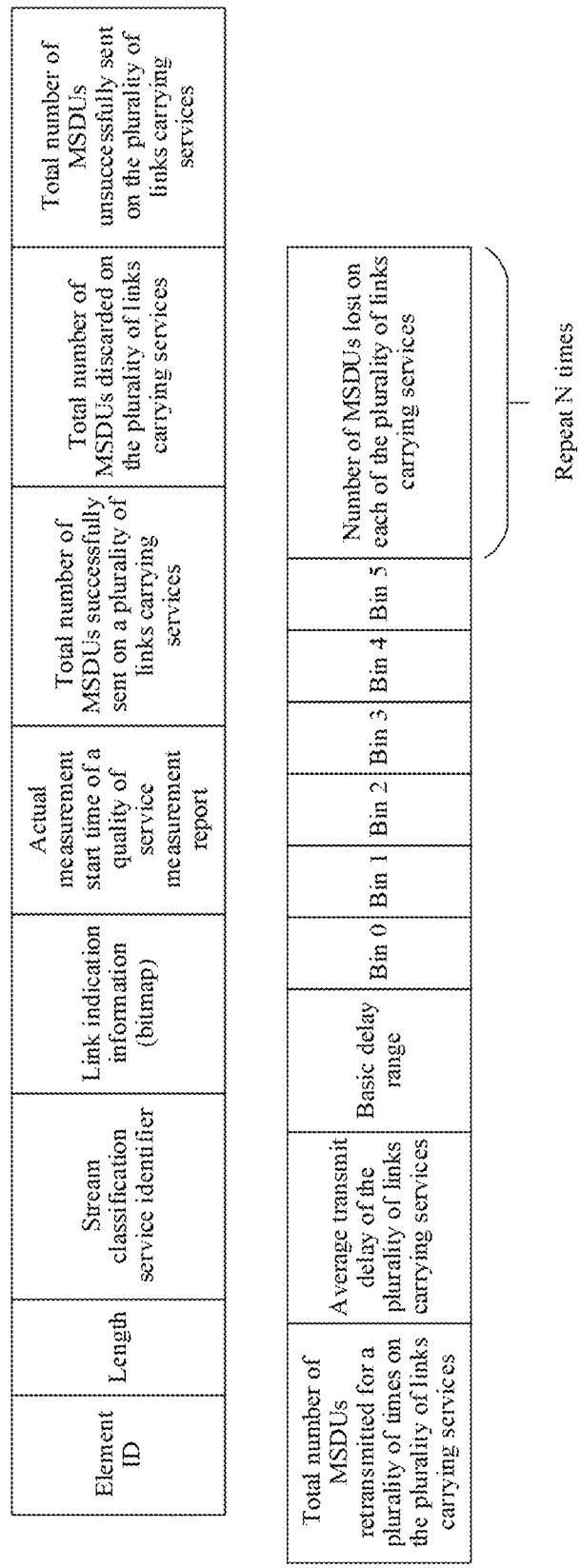
FIG. 30 is a schematic diagram of a format of still yet another traffic specification element in accordance with one or more embodiments.

In view of this, an embodiment of this application provides still yet another service indication method. A procedure of the method is the same as that in FIG. 7. Content of a quality of service measurement report is also basically the same as that in the embodiment shown in FIG. 7. A difference lies in that, in the embodiment shown in FIG. 7, the quality of service measurement report includes a traffic identifier bitmap, while in some embodiments, the quality of service measurement report includes an SCS ID, and an AP may obtain, based on the SCS ID carried in the received quality of service measurement report, quality of service of a low-delay service corresponding to the SCS ID on each link. A specific format of the quality of service measurement report is shown in FIG. 29 and FIG. 30.

In some embodiments, in another service indication method, a multi-link transmit device includes quality of service information of a link and link indication information in the quality of service measurement report. The link indication information indicates a plurality of links that carry the low-delay service. The quality of service information of a link includes a number of media access control service data units lost on each of the plurality of links that carry the low-delay service. Therefore, a peer end may accurately determine quality of service of each of the plurality of links based on the quality of service measurement report. This improves reliability of service transmission.

It may be clearly understood by a person skilled in the art that, for ease and brevity of description, for a detailed working process of foregoing systems, apparatuses, and units, refer to a corresponding process in the foregoing method embodiments. Details are not described herein again.

In the several embodiments provided in this application, it should be understood that the disclosed system, apparatus, and method may be implemented in other manners. For example, division into the units is merely logical function division and may be another division during actual implementation. For example, a plurality of units or components may be combined or integrated into another system, or some features may be ignored or not performed. The displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, in other words, may be located in one location, or may be distributed on a plurality of network units. Some or all of the units may be selected based on an actual requirement to achieve the objectives of the solutions of embodiments.

All or some of the foregoing embodiments may be implemented by software, hardware, firmware, or any combination thereof. When software is used to implement embodiments, all or some of embodiments may be implemented in a form of a computer program product. The computer program product includes one or more computer instructions. When the computer program instructions are loaded and executed on a computer, the procedures or functions according to embodiments of this application are all or partially generated. The computer may be a general-purpose computer, a dedicated computer, a computer network, or another programmable apparatus. The computer instructions may be stored in a computer-readable storage medium, or transmitted by using the computer-readable storage medium. The computer instructions may be transmitted from a website, computer, server, or data center to another website, computer, server, or data center in a wired (for example, a coaxial cable, an optical fiber, or a digital subscriber line (, DSL)) or wireless (for example, infrared, radio, or microwave) manner. The computer-readable storage medium may be any usable medium accessible by a computer, or a data storage device, such as a server or a data center, integrating one or more usable media. The usable medium may be a read-only memory (ROM), a random access memory (RAM), or a magnetic medium, for example, a floppy disk, a hard disk, a magnetic tape, a magnetic disk, or an optical medium, for example, a digital versatile disc (DVD), or a semiconductor medium, for example, a solid-state drive (SSD).

What is claimed is:

1. A service indication method, comprising:
generating quality of service requirement information comprising packet loss rate indication information, wherein
the packet loss rate indication information comprises an index value and a reference number of service data packets,
the reference number of service data packets indicates a reference measurement number for counting the packet loss rate,
the index value comprises one or more characters,
the index value which corresponds to an index item in a database,
the index item in the database has a mapping relationship with an acceptable maximum packet loss rate in the database,
the acceptable maximum packet loss rate comprises two or more characters,
a quantity of the one or more characters included in the index value is less than a quantity of the two or more characters included in the acceptable maximum packet loss rate; and
sending the quality of service requirement information.

2. The service indication method according to claim 1, wherein the quality of service requirement information further comprises a delay bound indicating an allowed maximum delay of a traffic stream.

3. The service indication method according to claim 2, wherein the quality of service requirement information further comprises a transmission direction indicating a direction of the traffic stream, and the transmission direction comprises one of uplink, downlink, direct link, or uplink and downlink.

4. The service indication method according to claim 1, wherein the quality of service requirement information further comprises at least one of:
- an element identifier identifying an element carrying the quality of service requirement information;
- a length indicating a number of bytes occupied by the element;
- a traffic identifier bitmap indicating a traffic identifier (TID) corresponding to the element;
- a minimum service interval between any two service periods of a traffic stream;
- a maximum service interval between any two service periods of the traffic stream;
- a service start time indicating start time of a service;
- a minimum data rate corresponding to a location of a service access point at a media access control (MAC) layer;
- a mean data rate corresponding to a location of the service access point at a MAC layer; or
- a burst size indicating a maximum burst size of the traffic stream.

5. The service indication method according to claim 1, wherein the quality of service requirement information further comprises:
- indication information indicating whether to enable triggering, based on an average packet loss rate, the sending of the quality of service requirement information, and a threshold of the average packet loss rate.

6. The service indication method according to claim 1, wherein the quality of service requirement information further comprises one or more of indication information indicating whether a service is a high-reliability service, indicating information indicating a maximum delay jitter of a service, indication information indicating whether to use a backup transmission mode, indication information indicating an expected channel access manner, or indication information indicating whether a restricted service period needs to be established.

7. The service indication method according to claim 1, wherein the acceptable maximum packet loss rate comprises a range of values including a minimum value and a maximum value.

8. The service indication method according to claim 1, wherein the acceptable maximum packet loss rate comprises a percentage.

9. The service indication method according to claim 1, wherein the index value is an integer, the index item is equal to the index value, the database is a table, and the index value is usable by a receiving device to determine the acceptable maximum packet loss rate based on the index value, the index item in the database, the mapping relationship with the acceptable maximum packet loss rate in the database.

10. A service indication apparatus, comprising:
- a processor; and
- a memory, having instructions stored thereon that, when executed by the processor, cause the service indication apparatus to:
  - generate quality of service requirement information comprising packet loss rate indication information, wherein
    - the packet loss rate indication information comprises an index value and a reference number of service data packets,
    - the reference number of service data packets indicates a reference measurement number for counting the packet loss rate,
    - the index value comprises one or more characters,
    - the index value which corresponds to an index item in a database,
    - the index item in the database has a mapping relationship with an acceptable maximum packet loss rate in the database,
    - the acceptable maximum packet loss rate comprises two or more characters,
    - a quantity of the one or more characters included in the index value is less than a quantity of the two or more characters included in the acceptable maximum packet loss rate; and
  - send the quality of service requirement information.

11. The service indication apparatus according to claim 10, wherein the quality of service requirement information further comprises a delay bound indicating an allowed maximum delay of a traffic stream.

12. The service indication apparatus according to claim 11, wherein the quality of service requirement information further comprises a transmission direction indicating a direction of the traffic stream, and the transmission direction comprises one of uplink, downlink, direct link, or uplink and downlink.

13. The service indication apparatus according to claim 10, wherein the quality of service requirement information further comprises at least one of:
- an element identifier identifying an element carrying the quality of service requirement information;
- a length indicating a number of bytes occupied by the element;
- a traffic identifier bitmap indicating a traffic identifier (TID) corresponding to the element;
- a minimum service interval between any two service periods of a traffic stream;
- a maximum service interval between any two service periods of the traffic stream;
- a service start time indicating start time of a service;
- a minimum data rate corresponding to a location of a service access point at a media access control (MAC) layer;
- a mean data rate corresponding to a location of the service access point at a MAC layer; or
- a burst size indicating a maximum burst size of the traffic stream.

14. The service indication apparatus according to claim 10, wherein the quality of service requirement information further comprises:
- indication information indicating whether to enable triggering, based on an average packet loss rate, the service indication apparatus to send the quality of service requirement information, and a threshold of the average packet loss rate.

15. The service indication apparatus according to claim 10, wherein the quality of service requirement information further comprises one or more of indication information indicating whether a service is a high-reliability service, indication information indicating a maximum delay jitter of a service, indication information indicating whether to use a backup transmission mode, indication information indicating an expected channel access manner, or indication information indicating whether a restricted service period needs to be established.

16. A non-transitory computer-readable storage medium, storing computer instructions, which when executed by a processor, cause an apparatus to:
- generate quality of service requirement information comprising packet loss rate indication information, wherein the packet loss rate indication information comprises an index value and a reference number of service data packets, the reference number of service data packets indicates a reference measurement number for counting the packet loss rate the index value comprises one or more characters, the index value which corresponds to an index item in a database, the index item in the database has a mapping relationship with an acceptable maximum packet loss rate in the database, the acceptable maximum packet loss rate comprises two or more characters, a quantity of the one or more characters included in the index value is less than a quantity of the two or more characters included in the acceptable maximum packet loss rate; and send the quality of service requirement information.

17. The non-transitory computer-readable storage medium according to claim 15, wherein the quality of service requirement information further comprises a delay bound indicating an allowed maximum delay of a traffic stream.

18. The non-transitory computer-readable storage medium according to claim 17, wherein the quality of service requirement information further comprises a transmission direction indicating a direction of the traffic stream, and the transmission direction comprises one of uplink, downlink, direct link, or uplink and downlink.

19. The non-transitory computer-readable storage medium according to claim 16, wherein the quality of service requirement information further comprises at least one of:
- an element identifier identifying an element carrying the quality of service requirement information;
- a length indicating a number of bytes occupied by the element;
- a traffic identifier bitmap indicating a traffic identifier (TID) corresponding to the element;
- a minimum service interval between any two service periods of a traffic stream;
- a maximum service interval between any two service periods of the traffic stream;
- a service start time indicating start time of a service;
- a minimum data rate corresponding to a location of a service access point at a media access control (MAC) layer;
- a mean data rate corresponding to a location of the service access point at a MAC layer; or
- a burst size indicating a maximum burst size of the traffic stream.

20. The non-transitory computer-readable storage medium according to claim 16, wherein the quality of service requirement information further comprises:
- indication information indicating whether to enable triggering, based on an average packet loss rate, the apparatus to send the quality of service requirement information, and a threshold of the average packet loss rate.

* * * * *

UNITED STATES PATENT AND TRADEMARK OFFICE
CERTIFICATE OF CORRECTION

PATENT NO.       : 11,956,336 B2
APPLICATION NO.  : 18/357292
DATED            : April 9, 2024
INVENTOR(S)      : Guogang Huang et al.

It is certified that error appears in the above-identified patent and that said Letters Patent is hereby corrected as shown below:

In the Claims

Claim 17 on Column 33, Lines 21-25 should be replaced with the following claim:
17. The non-transitory computer-readable storage medium according to claim 16, wherein the quality of service requirement information further comprises a delay bound indicating an allowed maximum delay of a traffic stream.

Signed and Sealed this
Twenty-eighth Day of May, 2024

Katherine Kelly Vidal
*Director of the United States Patent and Trademark Office*